US012613221B2

(12) United States Patent
Maruyama et al.

(10) Patent No.: US 12,613,221 B2
(45) Date of Patent: Apr. 28, 2026

(54) INFORMATION PROCESSING SYSTEM FOR NONDESTRUCTIVE INSPECTION AND NONDESTRUCTIVE INSPECTION METHOD

(71) Applicant: Konica Minolta, Inc., Tokyo (JP)

(72) Inventors: Kazunao Maruyama, Saitama (JP); Yoshiyuki Hashimoto, Hachioji (JP); Sei Koh, Hachioji (JP); Reiji Asano, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 619 days.

(21) Appl. No.: 17/634,538

(22) PCT Filed: Aug. 27, 2020

(86) PCT No.: PCT/JP2020/032272
§ 371 (c)(1),
(2) Date: Feb. 10, 2022

(87) PCT Pub. No.: WO2021/039880
PCT Pub. Date: Mar. 4, 2021

(65) Prior Publication Data
US 2022/0326182 A1     Oct. 13, 2022

(30) Foreign Application Priority Data
Aug. 28, 2019     (JP) .................................. 2019-155484

(51) Int. Cl.
*G01N 27/82*            (2006.01)
(52) U.S. Cl.
CPC ..................................... *G01N 27/82* (2013.01)
(58) Field of Classification Search
None
See application file for complete search history.

(56) References Cited

U.S. PATENT DOCUMENTS 5,456,113 A * 10/1995 Kwun ................ G01N 29/2412
73/622
5,457,994 A * 10/1995 Kwun ................ G01N 29/2412
73/594
(Continued)

FOREIGN PATENT DOCUMENTS

GB          2487572 A       8/2012
JP       H06138094 A   *   5/1994
(Continued)

OTHER PUBLICATIONS

JP 6305860 B2, IDS reference, translation (Year: 2018).*
(Continued)

*Primary Examiner* — Lina Cordero
(74) *Attorney, Agent, or Firm* — LUCAS & MERCANTI, LLP

(57)          ABSTRACT

An information processing system is for nondestructive inspection of a measurement target that is a magnetic material covered by a nonmagnetic body. The system includes an information processing device that reduces noise magnetic field components other than magnetic field components coming from the measurement target and/or emphasizes the magnetic field components coming from the measurement target in actual measurement data, based on the actual measurement data and virtual measurement data. The actual measurement data is obtained by applying a magnetic field to the measurement target and actually measuring a magnetic field coming from the measurement target using a magnetic sensor at a measurement position on a surface of the nonmagnetic body. The virtual measurement data is created under virtual conditions that are obtained by modifying actual measurement conditions.

20 Claims, 22 Drawing Sheets

(56) References Cited

U.S. PATENT DOCUMENTS

| | | | | |
|---|---|---|---|---|
| 2004/0183528 A1* | 9/2004 | Crouch | ................ | G01N 27/725 |
| | | | | 324/228 |
| 2009/0134867 A1* | 5/2009 | Hatanaka | ............... | G01R 33/12 |
| | | | | 324/229 |
| 2011/0148405 A1* | 6/2011 | Kato | ......................... | H01F 1/16 |
| | | | | 148/306 |
| 2014/0088889 A1* | 3/2014 | Duckworth | ........... | G01N 27/83 |
| | | | | 702/35 |
| 2015/0330946 A1* | 11/2015 | Davis | ..................... | G01N 27/82 |
| | | | | 324/252 |
| 2018/0059060 A1 | 3/2018 | Dusseault et al. | | |

FOREIGN PATENT DOCUMENTS

| | | | | |
|---|---|---|---|---|
| JP | 2005003405 | A | * | 1/2005 |
| JP | 4876248 | B2 | * | 2/2012 |
| JP | 2016173340 | A | * | 9/2016 |
| JP | 2017150904 | A | * | 8/2017 |
| JP | 6305860 | B2 | | 4/2018 |
| WO | 2020/027043 | A1 | | 2/2020 |

OTHER PUBLICATIONS

H. Scheel, B. Hillemeier, Capacity of the remanent magnetism method to detect fractures of steel in tendons embedded in pre-stressed concrete, NDT & E International, vol. 30, Issue 4, 1997, pp. 211-216, ISSN 0963-8695, https://doi.org/10.1016/S0963-8695(96)00058-8 (Year: 1997).*

JP2016173340A translation (Year: 2016).*

JP4876248B2 translation (Year: 2012).*

JPH06138094A translation (Year: 1994).*

JP2005003405A translation (Year: 2005).*

JP2017150904A translation (Year: 2017).*

PCT, International Search Report for the corresponding application No. PCT/JP2020/032272, dated Nov. 10, 2020, with English translation.

PCT, International Preliminary Report on Patentability for the corresponding application No. PCT/JP2020/032272, dated Nov. 10, 2020, with English translation.

Korean Office Action mailed Jun. 18, 2024, for the related Korean application No. 10-2022-7006483, with English machine translation, 11 pages.

W. Sharatchandra Singh, et al; Detection of leakage magnetic flux from near-side and far-side defects in carbon steel plates using a giant magneto-resistive sensor; Measurement Science and Technology; vol. 19, No. 1, Jan. 2008; 8 pages.

Dien Rahmawati, et al; Magnetic imaging system based on HMC5883L sensor array; 2017 5th International Conference on Instrumentation, Communications, Information Technology, and Biomedical Engineering (ICICI-BME), IEEE, Nov. 2017, pp. 225-229.

Extended European Search Report dated Aug. 23, 2022 for the corresponding application No. 20859025.7.

* cited by examiner

WITHOUT RUPTURE (NORMAL)
WITH RUPTURE (ABNORMAL)

200    400    600    800    1000    1200 [mm]    Y

MAGNET

21

REINFORCING BAR
(STEEL MATERIAL)

8

SOUND MODEL

*FIG.15A*
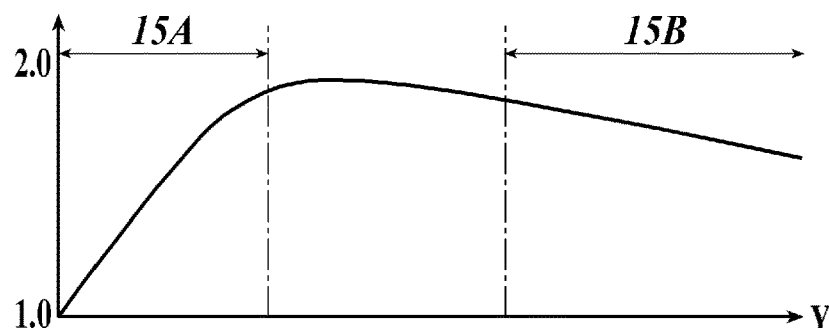
*FIG.15B*
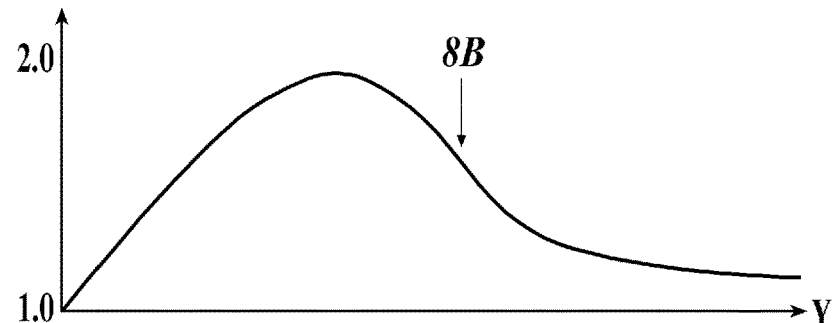
*FIG.16A*
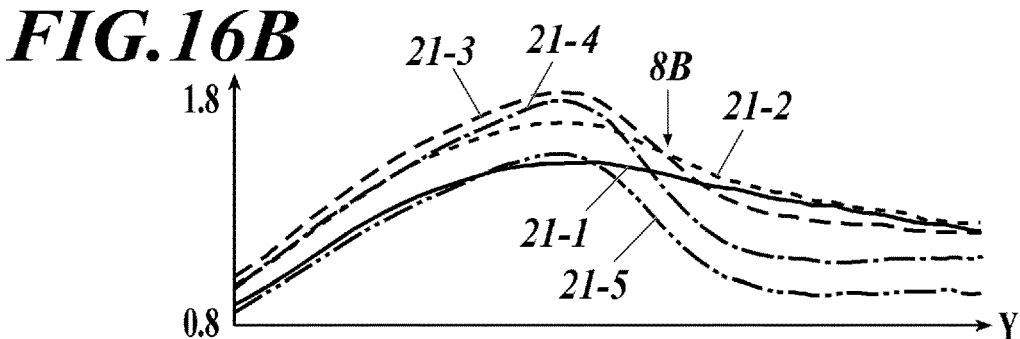
*FIG.16B*

MAGNETIC FLUX
DENSITY
[ $\mu$ T]

Y

GRADIENT [degree]

-30 degrees

Y

*TH1*

MAGNETIC FLUX
DENSITY
[ $\mu$ T]

*8B*

Y

GRADIENT [degree]

-30 degrees

*8B*

Y

*TH1*

*FIG.26A*
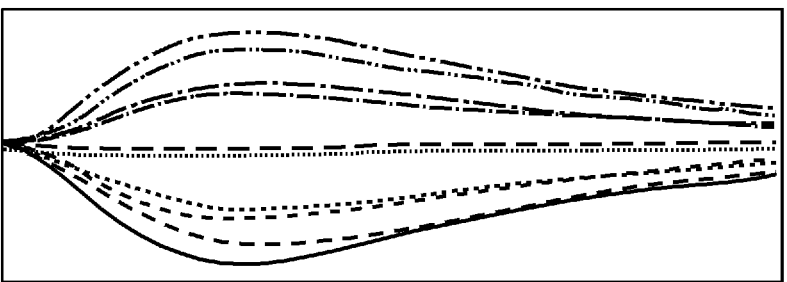
*FIG.26B*
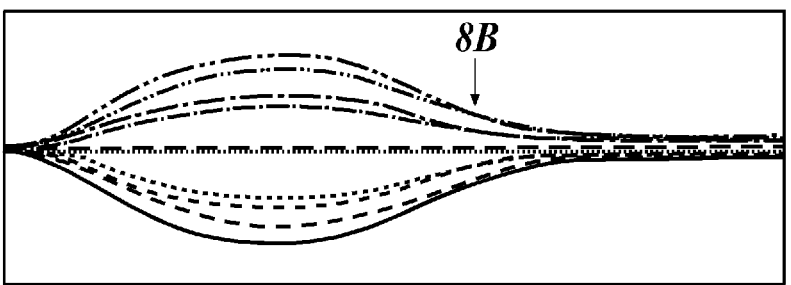
*FIG.27A*
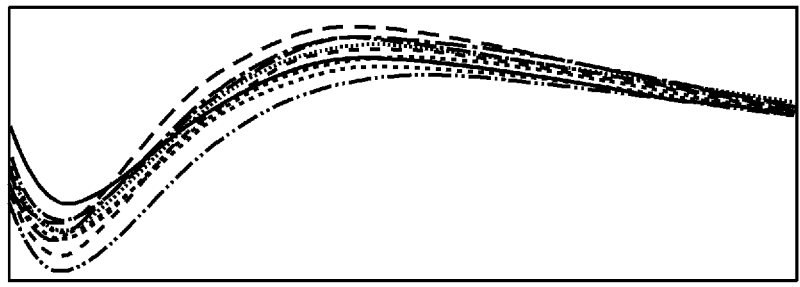
*FIG.27B*

INFORMATION PROCESSING SYSTEM FOR NONDESTRUCTIVE INSPECTION AND NONDESTRUCTIVE INSPECTION METHOD

CROSS REFERENCE TO RELATED APPLICATION

This Application is a 371 of PCT/JP2020/032272 filed on Aug. 27, 2020, which, in turn, claims priority of Japanese Patent Application No. 2019-155484 filed on Aug. 28, 2019, and the above applications are incorporated herein by reference.

TECHNICAL FIELD

The present invention relates to processing of measurement data in a nondestructive inspection that utilizes magnetism.

BACKGROUND

Nondestructive inspections utilizing magnetism are applied to detecting ruptures caused by corrosion or deterioration in magnetic materials (e.g., reinforcing bars, steel bars, wire) covered with nonmagnetic body materials (e.g., concrete, rubber). More specifically, the inspections are applied to detecting ruptures of pre-stressed concrete (PC) steel materials or reinforcing bars in bridge girders, bridge piers, and floorboards of roads and railroads.

As a conventional technology for nondestructive magnetic inspections for detecting ruptures of reinforcing bars and PC steel materials in concrete, an inspection device using the magnetic flux leakage testing has been proposed.

The patent document 1 describes a method, wherein data measured two times in regular and inverse magnetizing scanning directions is added in order to double magnetic power components of a reinforcing bar as a measurement target and offset magnetic components of a reinforcing bar that crosses the target reinforcing bar.

CITATION LIST

Patent Document

Patent Document 1: JP6305860

SUMMARY

Technical Problem

The presence or absence of a breakage in a measurement target and the position of the breakage can be determined by: applying a magnetic field to the measurement target; measuring a magnetic field from the measurement target with a magnetic sensor; and referring to the obtained measurement data.

In such a case, the magnetic components coming from the measurement target need to be made apparent by removing magnetic field components (noise) other than magnetic components coming from the measurement target and/or by emphasizing the magnetic field components coming from the measurement target. By visualizing the magnetic field components from the measurement target, presence/absence of a breakage and the position of the breakage can be easily determined.

However, two times of measurement as in the patent document 1 may require inefficient measuring operation.

Moreover, there may be a case where a measurement device needs to be removed and reset between the first measurement and the second measurement. In the case, the position of the first measurement data may not be consistent with the position of the second measurement data.

The present invention has been conceived in view of the above issue in the known art. The object of the present invention is to visualize magnetic field components coming from the measurement target so that the presence/absence of a breakage of the measurement target and the position of the breakage can be easily determined without lowering efficiency in measurement operation of a nondestructive inspection that utilizes magnetism.

Solution to Problem

According to an embodiment of the present invention, there is provided an information processing system for nondestructive inspection of a measurement target that is a magnetic material covered by a nonmagnetic body, the system including:

an information processing device that reduces noise magnetic field components other than magnetic field components coming from the measurement target and/or emphasizes the magnetic field components coming from the measurement target in actual measurement data, based on the actual measurement data and virtual measurement data, wherein the actual measurement data is obtained by applying a magnetic field to the measurement target and actually measuring a magnetic field coming from the measurement target using a magnetic sensor at a measurement position on a surface of the nonmagnetic body, and the virtual measurement data is created under virtual conditions that are obtained by modifying actual measurement conditions.

According to another embodiment of the present invention, there is provided a nondestructive inspection method of a measurement target that is a magnetic material covered by a nonmagnetic body, the method including:

reducing noise magnetic field components other than magnetic field components coming from the measurement target and/or emphasizing the magnetic field components coming from the measurement target in actual measurement data, based on the actual measurement data and virtual measurement data, wherein the actual measurement data is obtained by applying a magnetic field to the measurement target and actually measuring a magnetic field coming from the measurement target using a magnetic sensor at a measurement position on a surface of the nonmagnetic body, and the virtual measurement data is created under virtual conditions that are obtained by modifying actual measurement conditions.

Advantageous Effects of Invention

According to the present invention, magnetic field components coming from the measurement target can be visualized so that the presence/absence of a breakage of the measurement target and the position of the breakage is easily determined, without lowering efficiency of measurement operation in a nondestructive inspection that utilizes magnetism.

BRIEF DESCRIPTION OF DRAWINGS

FIG. 15A shows distribution curves of magnetic field components in the Z-axis direction;

FIG. 15B shows distribution curves of magnetic field components in the Z-axis direction;

FIG. 16A shows distribution curves of magnetic field components in the Z-axis direction;

FIG. 16B shows distribution curves of magnetic field components in the Z-axis direction;

FIG. 26A shows distribution curves of magnetic field components in the X-axis direction as an example of a processing result of visualizing magnetic field components coming from the measurement target;

FIG. 26B shows distribution curves of magnetic field components in the X-axis direction as an example of a processing result of visualizing magnetic field components coming from the measurement target;

FIG. 27A shows distribution curves of magnetic field components in the Y-axis direction as an example of a processing result of visualizing magnetic field components coming from the measurement target;

FIG. 27B shows distribution curves of magnetic field components in the Y-axis direction as an example of a processing result of visualizing magnetic field components coming from the measurement target;

DESCRIPTION OF EMBODIMENTS

Figure 1:
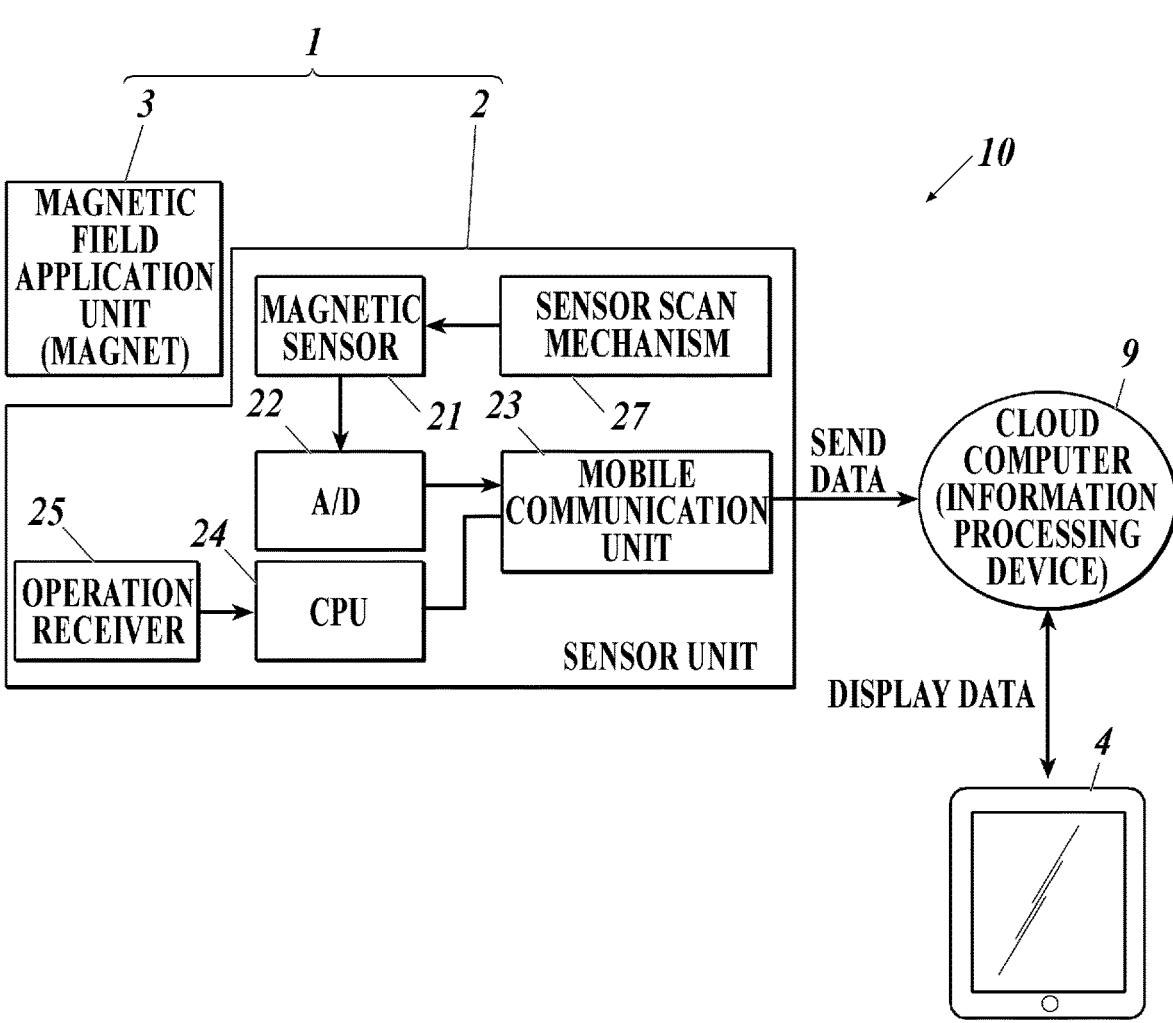
FIG. 1 is an overall configuration of a nondestructive inspection system according to an embodiment of the present invention.

Hereinafter, an embodiment of the present invention will be described referring to the drawings. The following is an embodiment of the present invention and does not limit the present invention.

[Overview of Nondestructive Inspection]

An overview is presented for a nondestructive inspection method as an embodiment of the present invention and a nondestructive inspection system (including an information processing system) as an embodiment of the present invention for performing the method. FIG. 1 is an overall configuration of the nondestructive inspection system according to an embodiment of the present invention.

As shown in FIG. 1, the nondestructive inspection system 10 in this embodiment includes a nondestructive inspection device 1, a cloud computer 9, and a portable computer 4. The nondestructive inspection device 1 includes a sensor unit 2 and a magnetic field application unit 3. The sensor unit 2 is a block for measuring magnetism. The sensor unit 2 is mounted with multiple magnetic sensors 21. Each magnetic sensor 21 may be a uniaxial sensor that detects magnetic field components in one axis direction from a measurement target. However, it is more preferable that the magnetic sensor 21 be a triaxial sensor capable of obtaining three-dimensional distributions of magnetic field components around the magnetic sensor. When a triaxial sensor is used as the magnetic sensor 21, it is preferable that the triaxial sensor be capable of detecting magnetic field components in three axis directions perpendicular to each other. However, the magnetic sensor 21 may be a combination of three uniaxial sensors that have sensor axes in the three axis directions perpendicular to each other.

Known examples of the magnetic sensor 21 include a hall element as a semiconductor sensor, a magneto resistive (MR) sensor, a magneto-impedance (MI) sensor, a tunnel type magneto resistive (TMR) sensor. The measurement device uses a hall element sensor for its balance of magnetic sensitiveness and dynamic range.

The voltage generated by the magnetic sensor 21 is converted into digital values by an A/D converter 22, and the measurement data is sent to the outside via a mobile communication unit 23. The sensor unit 2 includes: a central processing unit (CPU) 24 that performs overall control; and an operation receiver 25. The sent data is subjected to processing for visualizing magnetic field components coming from the measurement target by the cloud computer 9, which is an example of the information processing device in the system.

The magnetic field application unit 3 in this embodiment includes a permanent magnet.

The magnetic field application unit 3 in this embodiment applies either a N-pole or S-pole magnetic field to the measurement target and forms magnetic flows in the measurement target. The measurement target is a magnetic body, such as a steel material covered by a nonmagnetic body (e.g., concrete structure). The sensor unit 2 measures, using the magnetic sensors 21, magnetism leaking from the measurement target in which the magnetic flows are formed. This is called the magnetic stream method.

The cloud computer 9 is a Web server. The cloud computer 9 is capable of immediately processing the measurement data uploaded by the sensor unit 2 and display the measurement data with a browser application of the portable computer 4.

Figure 2A:
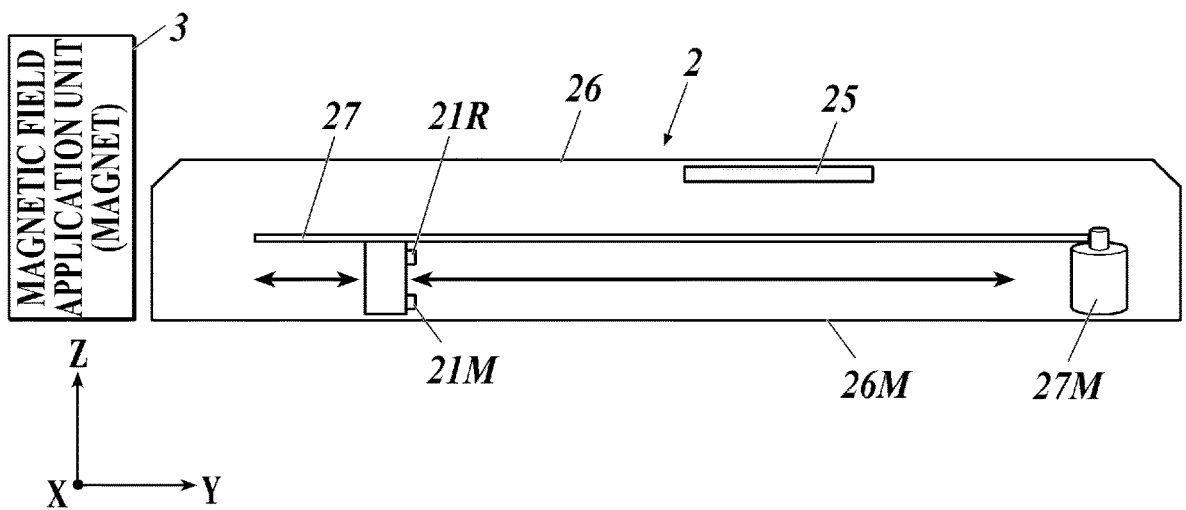
FIG. 2A is a schematic front view of a nondestructive inspection device according to the embodiment of the present invention.
Figure 2B:
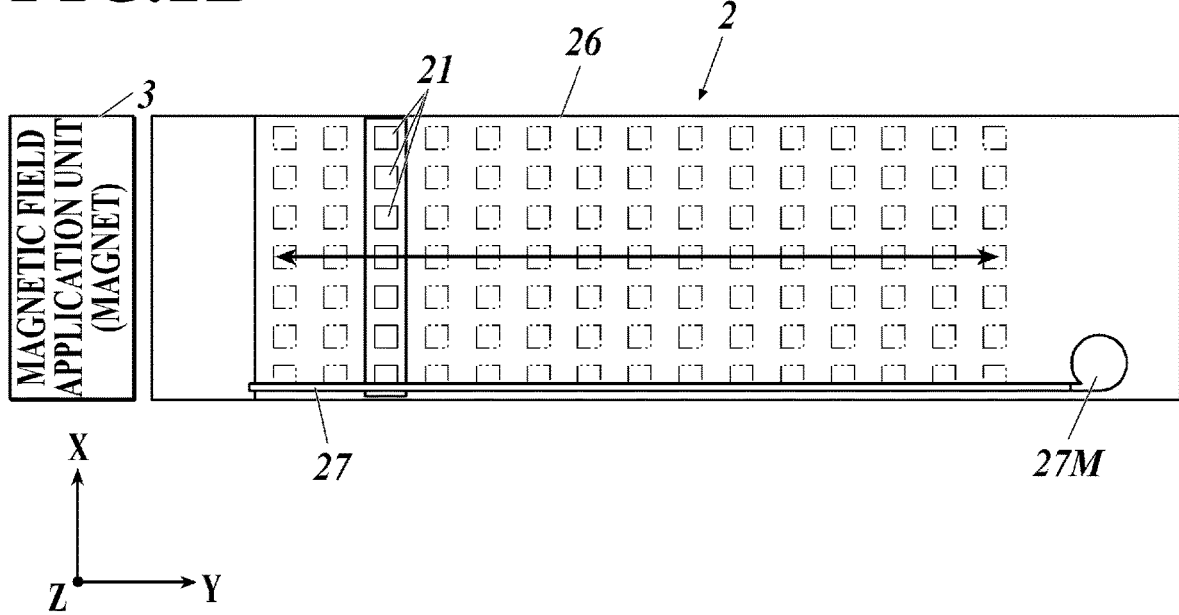
FIG. 2B is a schematic plan view of the nondestructive inspection device according to the embodiment of the present invention.
Figure 3:
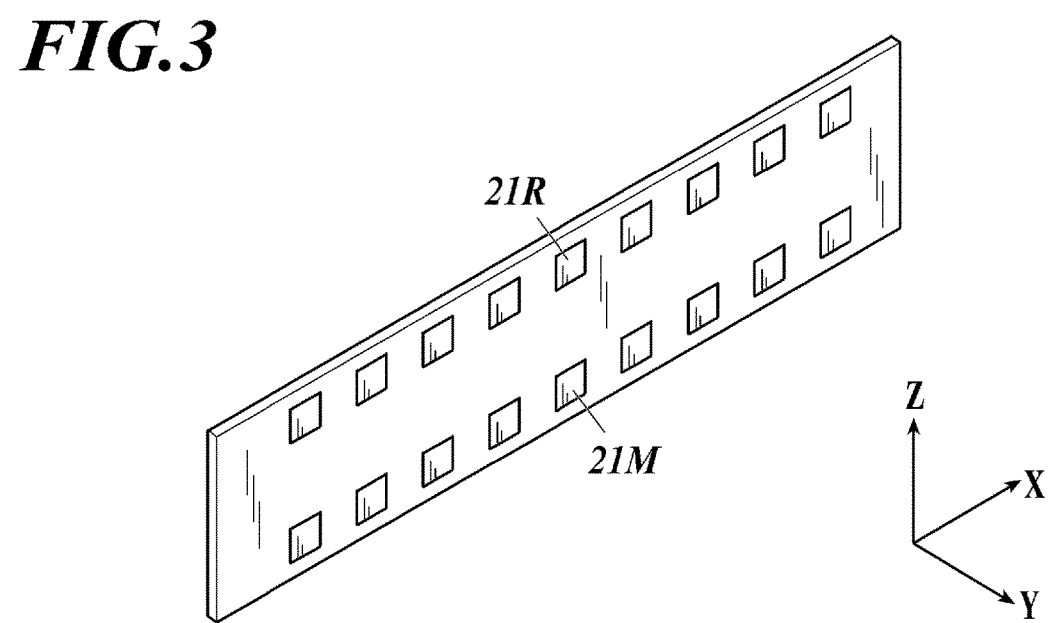
FIG. 3 is a perspective view of a sensor substrate according to the embodiment of the present invention.

FIG. 2 and FIG. 3 show a configuration of the nondestructive inspection device in this embodiment of the present invention.

As shown in FIG. 2, in a casing 26, a sensor array mounted with one or more magnetic sensors 21 (21M, 21R) is positioned close to a measurement surface 26M. In this embodiment, the sensor array is formed as an example. In the figures, three axis directions X, Y, and Z perpendicular to each other are shown. The first direction is the Y axis, the second direction is the Z axis, and the third direction is the X axis.

The magnetic field application unit 3 and the magnetic sensors 21 are arranged in the first direction Y, as shown in FIG. 2. The multiple magnetic sensors 21 are arranged in the X direction, as shown in FIG. 2B. Two magnetic sensors 21M, 21R are arranged in the Z direction, as shown in FIG. 2A and FIG. 3. The measurement surface 26M is one of external surfaces of the casing 26. The magnetic sensors 21 are arranged close to the measurement surface 26M. The space of the casing 26 opposite the measurement surface 26M houses, for example, the operation receiver 25, a circuit mounted with the A/D converter 22, the mobile communication unit 23, the CPU 24, and so forth. The edge surface as the S pole or N pole of the magnetic field application unit 3 is arranged at substantially the same Z-axis coordinate position as the measurement surface 26M. The magnetic field application unit 3 and the sensor unit 2 are fixed as one body.

Among the two magnetic sensors 21M, 21R arranged in the Z direction, the main sensor 21M is closer to the measurement surface 26M, and the reference sensor 21R is farther from the measurement surface 26M.

The sensor unit 2 is capable of performing scanning detections in which the sensor unit 2 performs detection while moving the magnetic sensors 21 in the Y direction with a sensor scan mechanism 27 driven by a motor 27M. In actual measurement, the sensor unit 2 performs the scanning detections with the magnetic sensors 21 in a state where the measurement surface 26M of the casing 26 is set and fixed on a measured surface (e.g., surface of concrete) of a measurement target structure that covers the measurement target. The sensor scan mechanism 27 is configured to allow the magnetic sensors 21 to scan desired positions of the measurement target and to stop and perform measurement at a desired position, provided that the sensor unit 2 and the magnetic field application unit 3 are not moved from the fixed position with respect to the measurement target in the measurement. This allows device to measure the same position repetitively as many times as desired. Further, the distance between the magnetic field application unit 3 and the measurement position is reproducible.

The measurement principle of the magnetic stream method in the present invention is described with reference to FIG. 4.

Figure 4:
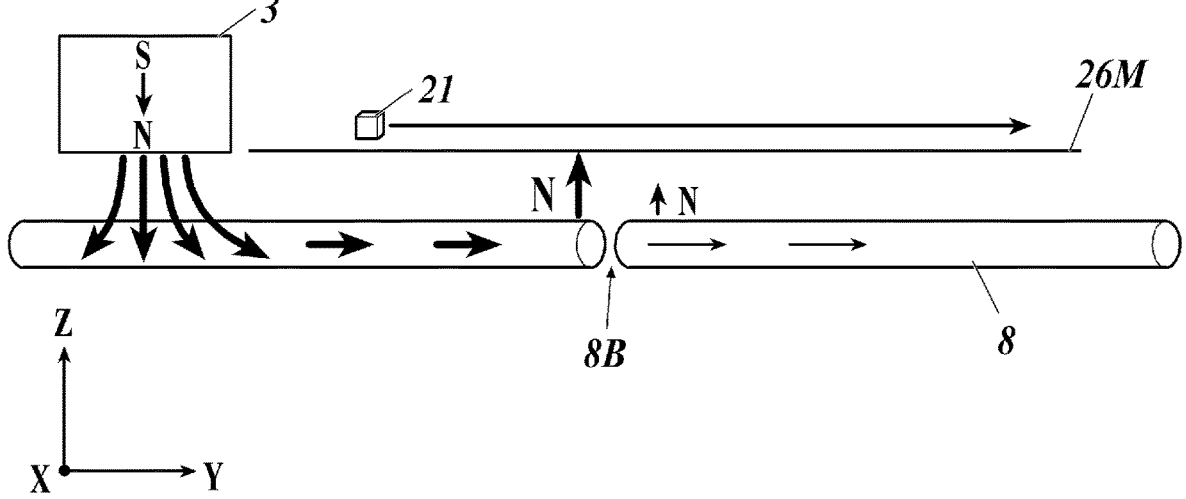
FIG. 4 shows the state of measurement by a magnetic stream method according to the present invention.

FIG. 4 shows a schematic view of the state where the magnetic flows are formed for the measurement principle in the present invention.

Assume that the measurement target 8 is a magnetic material, such as a reinforcing steel bar or a PC steel material, and that the measurement target 8 has a rupture part 8B that is a gap of about 1 centimeter at the central part. The nonmagnetic body (concrete) covering the measurement target 8 is not illustrated, and the same applies hereinafter.

The magnetic field application unit 3 applies the N-pole magnetic field to the measurement target 8, so that magnetic flows are formed in the measurement target 8 as a magnetic body. The magnetic flows in the magnetic body are released outside little by little, and gradually attenuate. The magnetic sensors 21 are configured to perform scanning along the measurement target 8 so as to detect the leaking magnetic flux in the longitudinal direction of the measurement target 8. The magnetic field applied to the measurement target 8 by the magnetic field application unit 3 may be either the N-pole or S-pole magnetic field. More specifically, the nondestructive inspection device 1 in this embodiment is configured to: apply, with the magnetic field application unit 3, a first-pole characteristic magnetic field (either N-pole or S-pole characteristic) to the measurement target 8 that is positioned next to the magnetic field application unit 3 and the magnetic sensors 21 in the second direction Z and that extends in the first direction Y; and detect, with the magnetic sensors 21, the magnetic field coming from the measurement target 8 that has formed distribution of the magnetic field that attenuates as leaving from the magnetic field application unit 3 within the range of the first-pole magnetic field. The nondestructive inspection device 1 measures, with the magnetic sensors 21, the magnetic field at multiple positions having different distances from the magnetic field application unit 3 along the first direction Y. The nondestructive inspection device 1 thus obtains the magnetic field distribution corresponding to the distance from the magnetic field application unit 3 along the first direction Y. In this embodiment, the nondestructive inspection device 1 includes the sensor scan mechanism 27 that moves the magnetic sensors 21 in the first direction Y on the casing 26, one end of which in the first direction Y is fixed to the magnetic field application unit 3. Thus, the nondestructive inspection device 1 can obtain the magnetic distribution corresponding to the distance from the magnetic field application unit 3 along the first direction Y.

When there is no rupture in the measurement target 8, the leaking magnetic forces gradually weaken as separating farther from the magnetic field application unit 3. When the measurement target 8 has the rupture part 8B as shown in FIG. 4, the rupture part 8B breaks off the magnetic flows, and a large amount of the magnetic forces is released before the rupture part 8B. As a result, the magnetic flows in the measurement target 8 decrease after the rupture part 8B. The nondestructive inspection device 1 can detect difference due to the presence/absence of a rupture in distribution of leaking magnetic flux from the measurement target 8.

Figure 5:
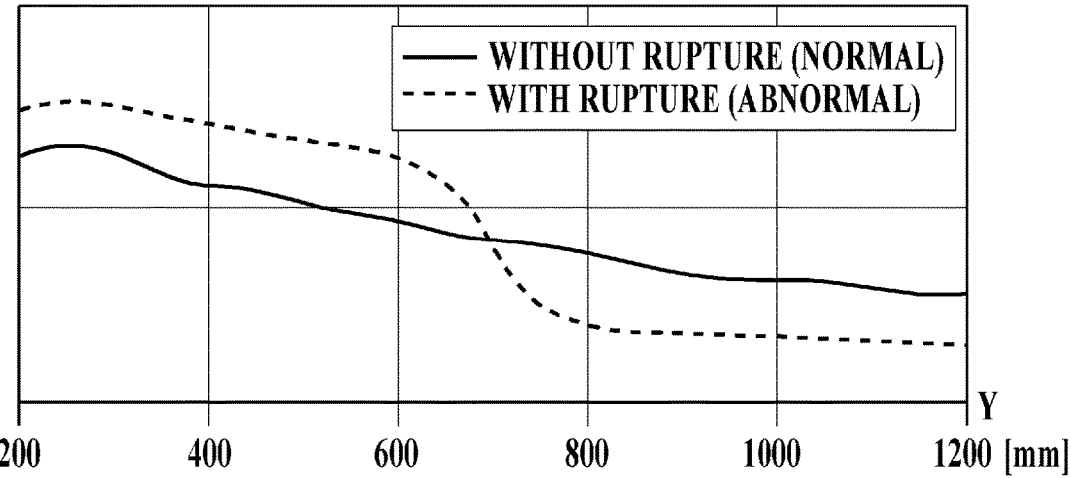
FIG. 5 is an example of measurement waveforms representing magnetic field distribution of magnetic field components in a Z direction along a first direction Y.

FIG. 5 is an example diagram showing waveforms of the measured magnetic field distribution along the first direction Y.

Figure 6:
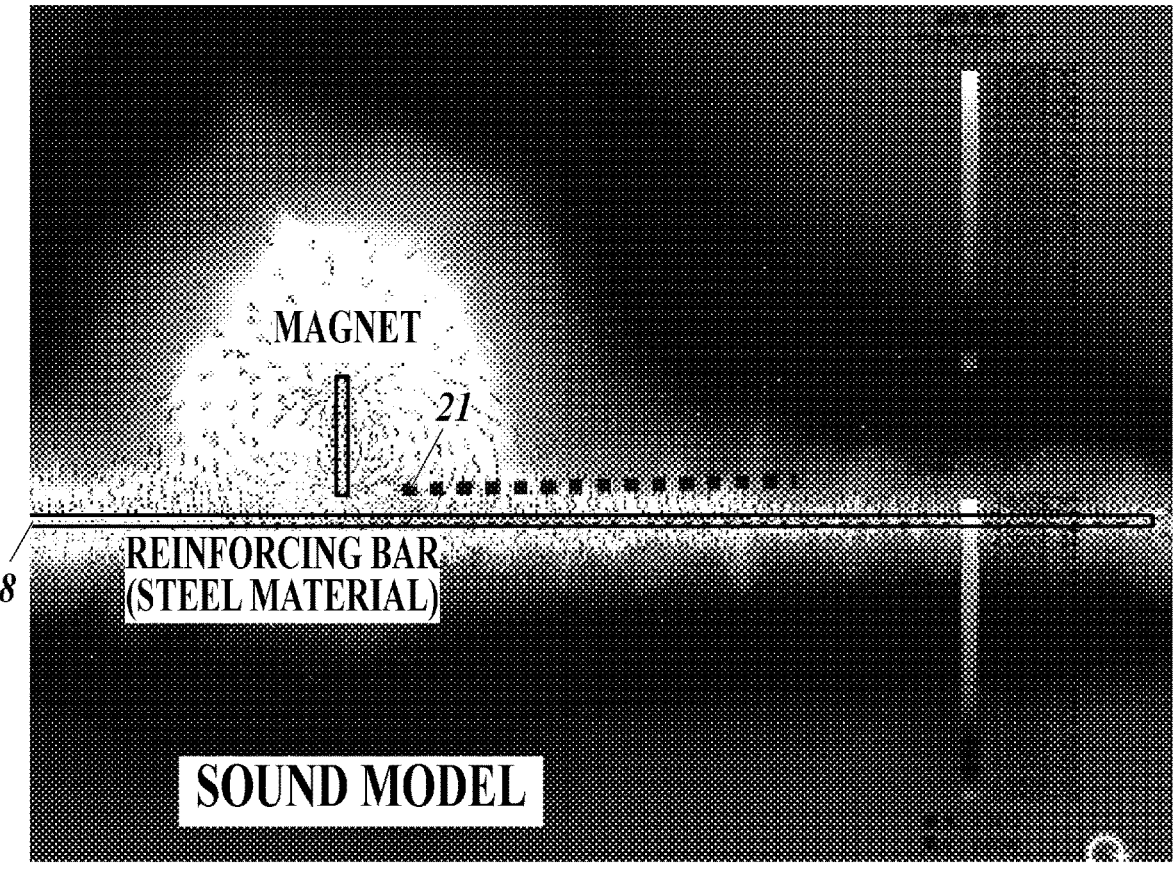
FIG. 6 shows two-dimensional magnetic field distribution of a sound model on the Y-Z plane.
Figure 6:
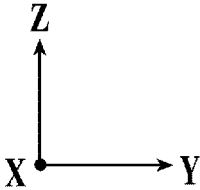
Figure 7:
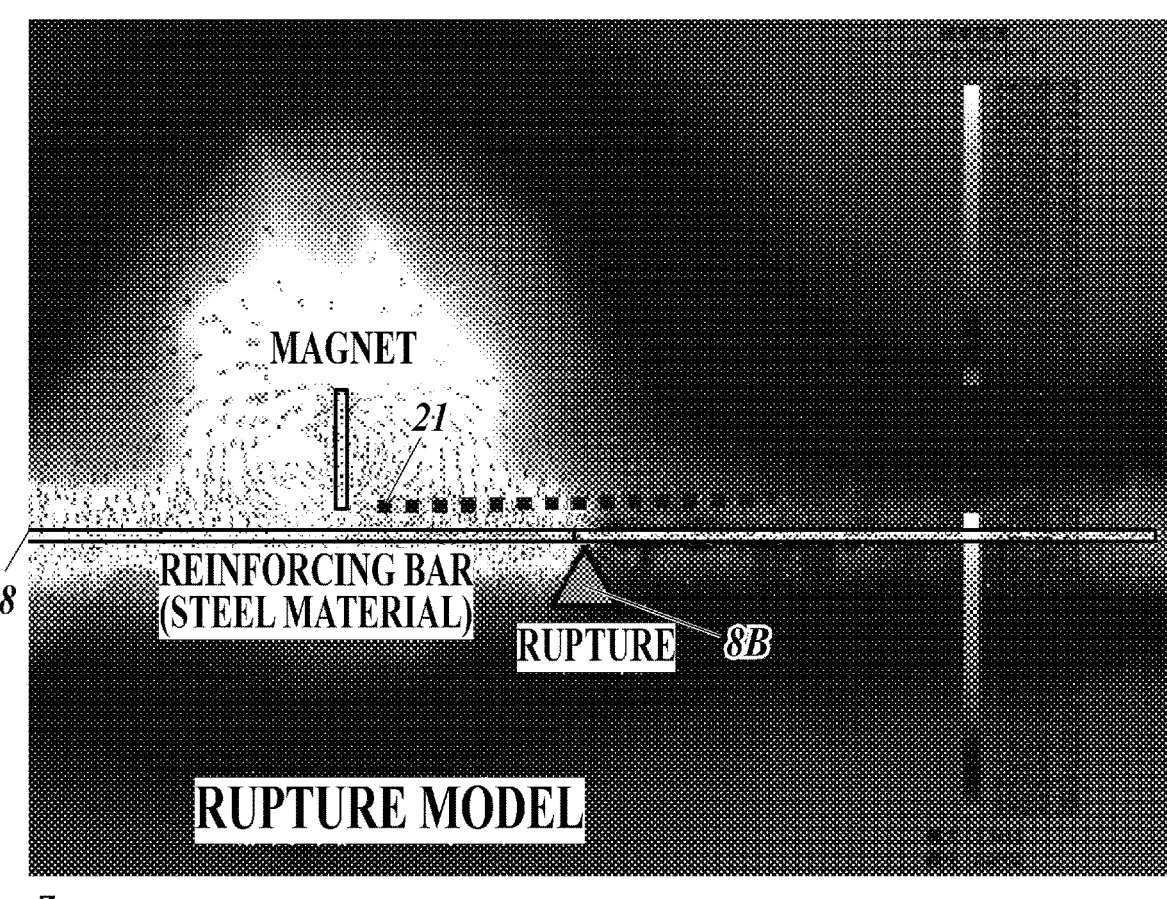
FIG. 7 shows two-dimensional magnetic field distribution of a rupture model on the Y-Z plane.
Figure 7:
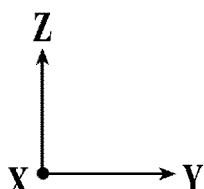

FIG. 5 shows magnetic field distributions in the vertical axis (Z axis) direction on the scanning line, which is separate from the measurement target 8 by a certain distance in the Z direction. The distributions are detected by the magnetic sensors 21 under each of the following two conditions: the measurement target has a rupture in the middle part (rupture model); and the measurement target 8 does not have a rupture (sound model). FIG. 6 and FIG. 7 show the two-dimensional distribution (grey-scale distribution converted from a color heat map) of the magnetic field on the Y-Z plane, which were separately measured. FIG. 6 shows the sound model. FIG. 7 shows the rupture model. In FIG. 6 and FIG. 7, the whiter part corresponds to the strong magnetic field part, and the black squares indicate the measurement positions of the magnetic sensors 21.

As described above, when the measurement target 8 does not have a rupture, the magnetic forces applied by the magnetic field application unit 3, which is positioned left to the measurement target 8 in FIG. 4, are gradually released outside and attenuate while flowing through the measurement target 8 in the Y direction (see the solid-line graph in FIG. 5 and FIG. 6).

On the other hand, when the measurement target 8 has a rupture in the middle part, the magnetic forces applied by the magnetic field application unit 3 are gradually released outside and attenuate while flowing in the measurement target 8 until reaching the rupture part 8B. At the rupture part 8B, the magnetic forces flowing through the measurement target 8 are cut off at the rupture part 8, and little magnetic force flows after the rupture part 8B. As a result, the waveform rapidly decreases after the rupture part 8B (see a dashed-line graph in FIG. 5 and FIG. 7). As a large amount of magnetic forces are released in front of the rupture part 8B, the values measured in front of the rupture part 8B (the values in the left region of the rupture model figure) are greater than the corresponding values of the sound model figure. This is also a characteristic of the rupture. The above-described tendencies in the magnetic field distribution due to the presence/absence of a rupture also apply to the magnetic field distributions at the respective measurement positions of the magnetic sensors 21 (black squares in FIG. 6 and FIG. 7). When the magnetic field distribution at the measurement positions of the magnetic sensors 21 (black squares) is observed along the Y direction so as to leave the magnet, the magnetic field attenuates at substantially the same decrease rate in the sound model shown in FIG. 6. On the other hand, in the rupture model shown in FIG. 7, the magnetic field intensifies in front of the rupture part 8B and then rapidly attenuates in contrast after the rupture part 8B. Thus, the magnetic sensors 21, which are separate from the measurement target 8 in the Z direction, can measure the magnetic field distribution as shown in FIG. 5.

The magnetic field distribution curves shown in FIG. 5 are created on the basis of the measurement data by the cloud computer 9 in FIG. 1 performing processing of creating images for display. The created distribution curves are displayed on the browser of the portable computer 4 or a personal computer. The user can check whether a rupture is present by referring to the magnetic field distribution curve.

Figure 8:
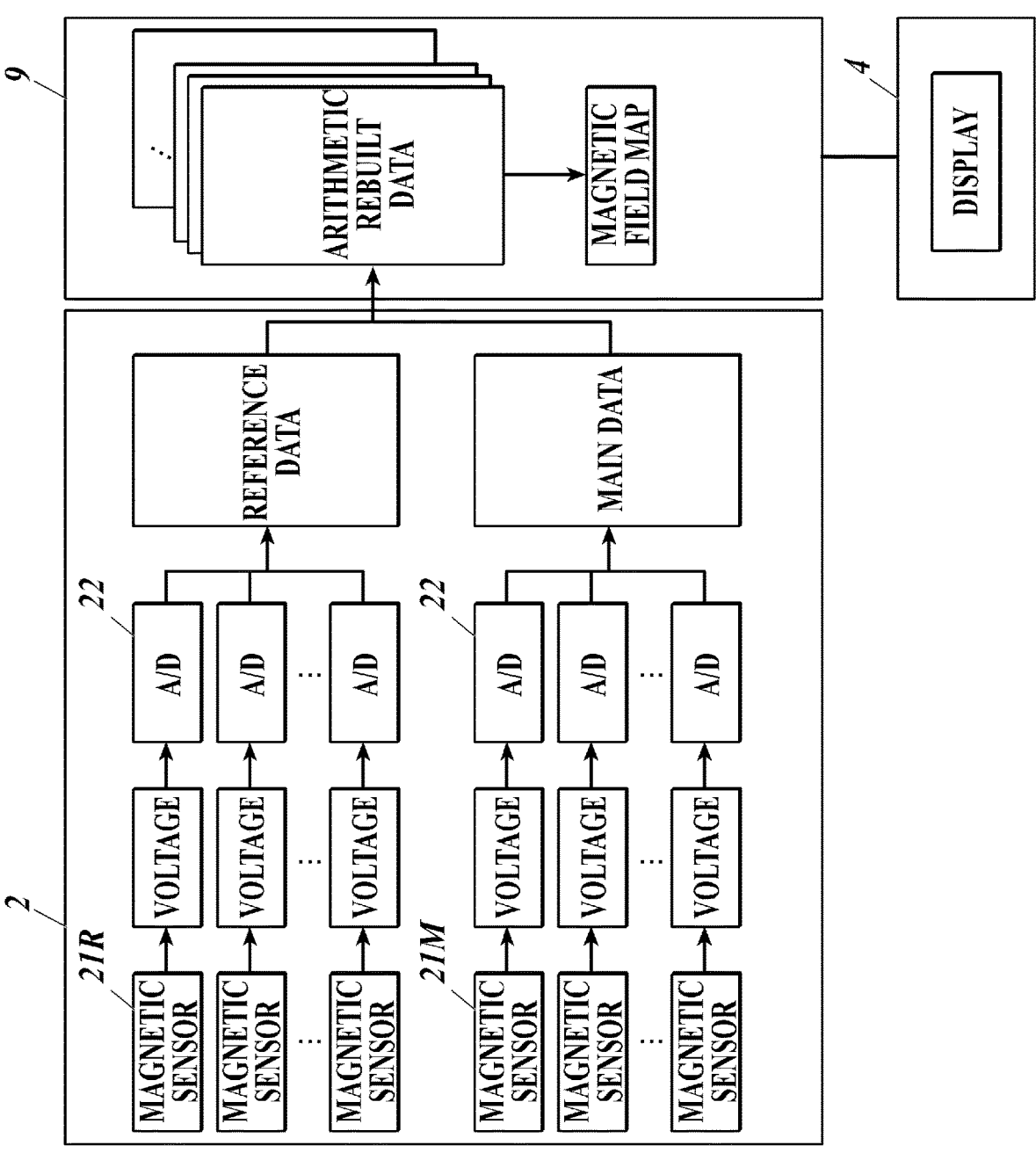
FIG. 8 is a block diagram including a circuit configuration block that creates main data and reference data as two-dimensional distribution data.

Creation of the two-dimensional distribution magnetic data in this embodiment is described with reference to FIG. 8.

The sensor unit 2 of the nondestructive inspection device 1 includes multiple magnetic sensors 21 (main sensor 21M, reference sensor 21R), as shown in FIG. 2 and FIG. 3.

Herein, the magnetic sensors 21 are hall element sensors. A characteristic of a hall element sensor is that its electromotive force changes according to the intensity of the applied magnetic field. As shown in FIG. 8, the analog voltage changes of the magnetic sensors 21 are subject to A/D conversion to create digital data. Thus, the main data and the reference data is generated. The main data is a group of measurement values at respective measurement positions by the main sensors 21M. The reference data is a group of measurement values at respective measurement positions by the reference sensors 21R. The main data and the reference data are two-dimensional distribution data that have measurement values at respective measurement positions that are arranged two-dimensionally on the X-Y plane. The main data and the reference data are sent from the nondestructive inspection device 1 to the cloud computer 9. On the basis of the main data and reference data, the cloud computer 9 calculates/corrects ratios and/or differences to obtain arithmetic rebuilt data. In the arithmetic rebuilt data, data on the magnetic field coming from the measurement target 8 is extracted. On the basis of the arithmetic rebuilt data, the cloud computer 9 creates and outputs images for display. The images for display are displayed on the portable computer 4 and used by the user to judge the result.

Figure 9:
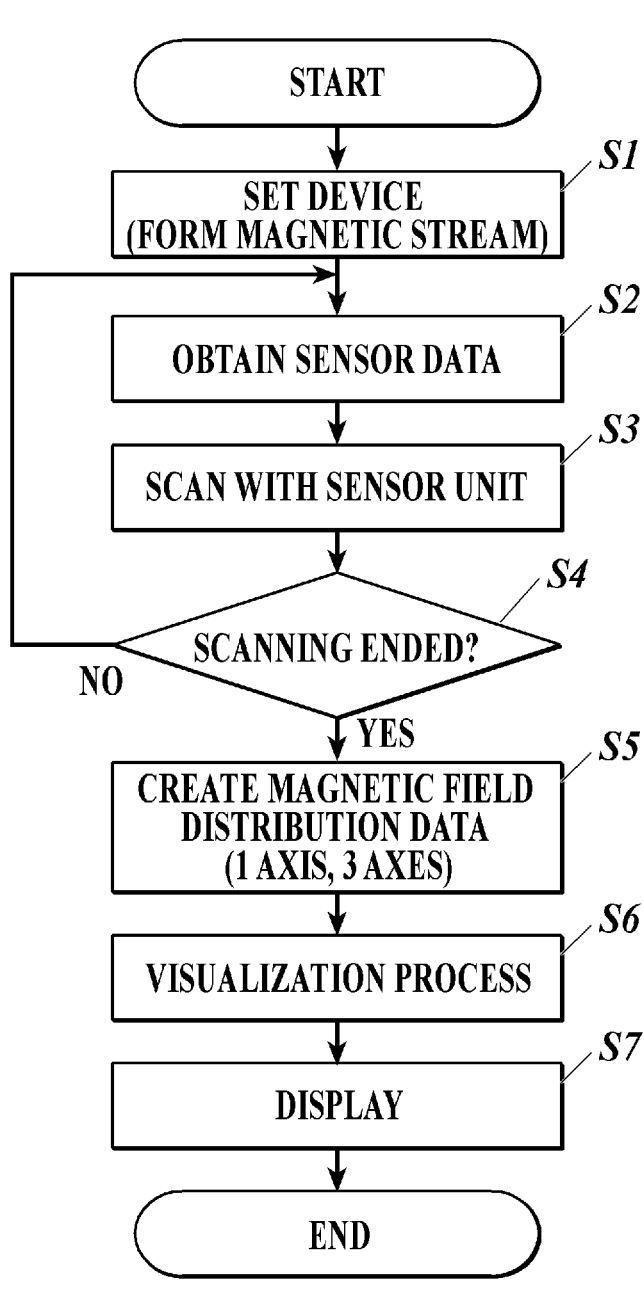
FIG. 9 is a flowchart showing a basic flow of a nondestructive inspection.

The basic flow of the nondestructive inspection with the magnetic stream method in this embodiment is described with reference to FIG. 9. In the following, the nondestructive inspection device 1 as shown in FIG. 1 to FIG. 3 is used.

(Step 1) Position the nondestructive inspection device 1 such that the magnetic sensors 21 and the measurement surface 26M closely face the surface of concrete that covers the measurement target 8. With the magnetic field application unit 3, apply a magnetic field to form a magnetic flow (magnetic stream) in the measurement target 8.

(Step S2) While forming the magnetic flow in Step 1, detect magnetic flux from the measurement target 8 with the magnetic sensors 21.

(Step 3) Without changing the position of the nondestructive inspection device 1, shift the magnetic sensors 21 by only one step in the Y direction with the sensor scan mechanism 27 and perform scanning.

(Step S4) Check whether the scanning and measuring has been done in all shift positions. If not, return to Step S2. If yes, proceed to Step S5.

(Step S5) The nondestructive inspection device 1 creates magnetic field distribution data of the entire scanned surface, on the basis of data obtained in all shifted positions. When the magnetic sensors 21 are uniaxial sensors, the data is surface data showing distribution of magnetic field components in one-axis direction. When the magnetic sensors 21 are triaxial sensors, the data is surface data showing distribution of magnetic field components in three-axis directions.

Herein, it is optional whether to calculate the above-described arithmetic rebuilt data on the basis of the obtained magnetic field distribution data.

(Step S6) The cloud computer 9 performs, on the magnetic field distribution data (actual measurement data), processing of visualizing magnetic field components coming from the measurement target 8.

(Step S7) The cloud computer 9 further creates an image (s) for display on the basis of the data processed in Step S6. The image is displayed on the portable computer 4 or the like.

When the inspection is performed on a target having an area wider than the entire scanning surface of the magnetic sensors 21, the nondestructive inspection device 1 is moved to a region that has not been measured yet and repeats the above Steps S1 to S6.

[Processing of Visualizing Magnetic Field Components Coming from Measurement Target]

Processing of visualizing magnetic field components coming from the measurement target 8 by the information processing device (cloud computer 9) in the system is described. This processing corresponds to Step S6. The information processing device (9) reduces noise magnetic field components other than magnetic field components coming from the measurement target and/or emphasizes the magnetic field components coming from the measurement target in actual measurement data, based on the actual measurement data (obtained in Step S5) and virtual measurement data created under virtual conditions. The actual measurement data is obtained by applying a magnetic field to the measurement target 8 and actually measuring a magnetic field coming from the measurement target 8 using the magnetic sensors 21 at a measurement position on a surface of the nonmagnetic body. The virtual conditions are obtained by modifying actual measurement conditions.

The information processing device (9) stores the virtual measurement data in a memory. The virtual measurement data is created by: building, in a computer, a virtual measurement model that reproduces actual measurement conditions at a predetermined accuracy; and performing a simulation(s) under virtual conditions in which the virtual measurement model is modified according to processing contents, as described below. The virtual measurement data may not be created by a computer. The virtual measurement data may be obtained on the basis of measurement with an existing experimental model. The information processing device (9) uses this virtual measurement data for reducing noise magnetic field components and emphasizing magnetic field components coming from the measurement target.

(1) Processing of Reducing Direct Magnet Components

The information processing device (9) performs calculation on the basis of the virtual measurement data and the actual measurement data to reduce, in the actual measurement target, noise magnetic field components that directly reach the magnetic sensors 21 from the magnetic field source (3) for measurement. The virtual measurement data is created under virtual conditions that: the magnetic field source for measurement (3) that applies a magnetic field to the measurement target is present but the measurement target 8 is absent in the actual measurement.

The virtual conditions are different from the actual measurement conditions only in that the measurement target 8 is absent under the virtual conditions.

FIG. 10 to FIG. 12 show measurement data obtained by performing scanning in the Y direction with five magnetic sensors (magnetic sensors 21-1 to 21-5) that are arranged in the X direction. The horizontal axis is the Y axis indicating the distance from the measurement position. FIG. 10 relates to magnetic field components in the X axis direction. FIG. 11 shows magnetic field components in the Y axis direction. FIG. 12 shows magnetic field components in the Z axis direction.

Figure 10A:
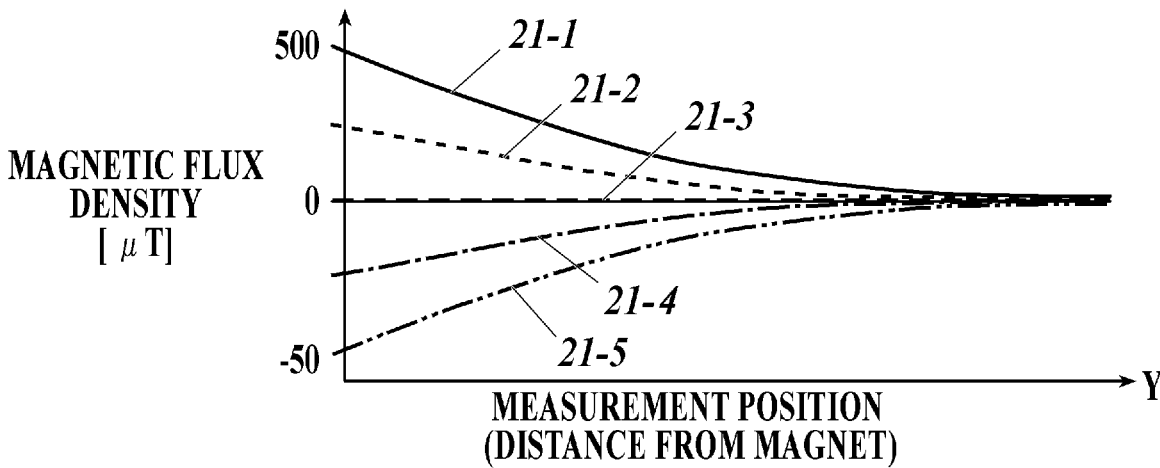
FIG. 10A shows distribution curves of magnetic field components in a X-axis direction.
Figure 11A:
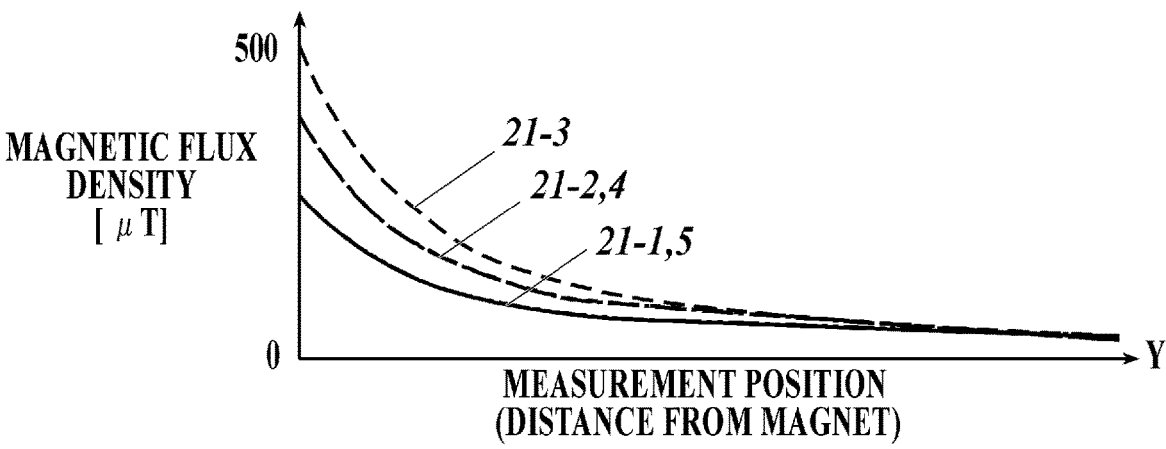
FIG. 11A shows distribution curves of magnetic field components in the Y-axis direction.
Figure 12A:
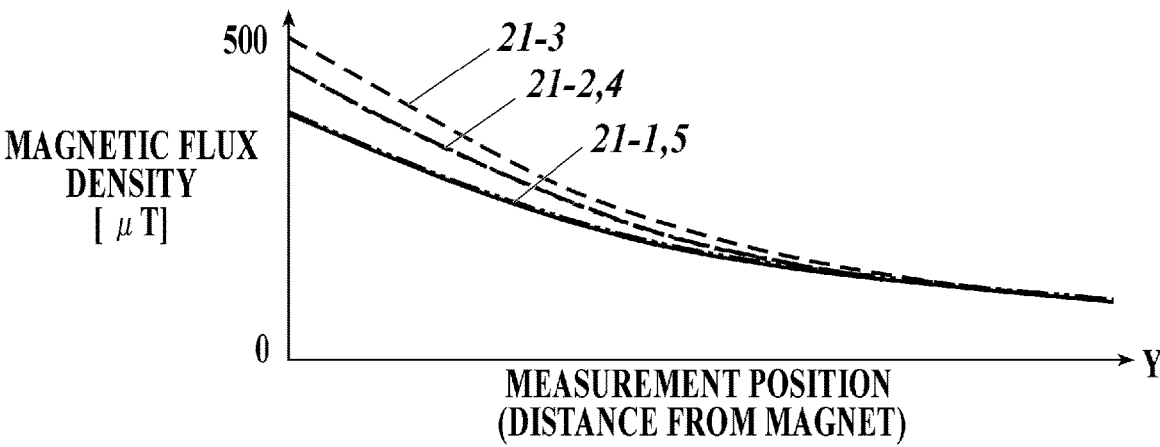
FIG. 12A shows distribution curves of magnetic field components in the Z-axis direction.

FIG. 10A, FIG. 11A, and FIG. 12A show the normalized actual measurement data.

Figure 10B:
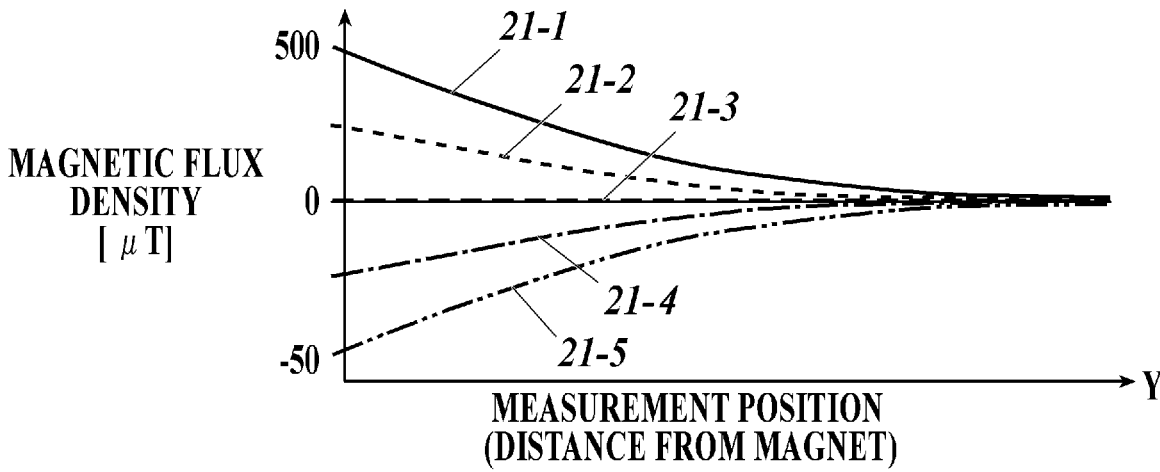
FIG. 10B shows distribution curves of magnetic field components in the X-axis direction.
Figure 11B:
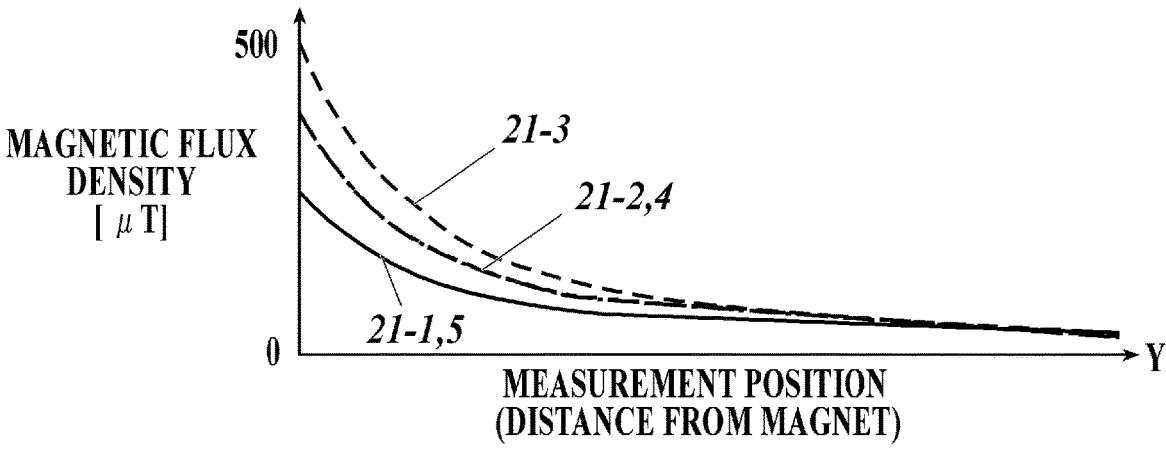
FIG. 11B shows distribution curves of magnetic field components in the Y-axis direction.
Figure 12B:
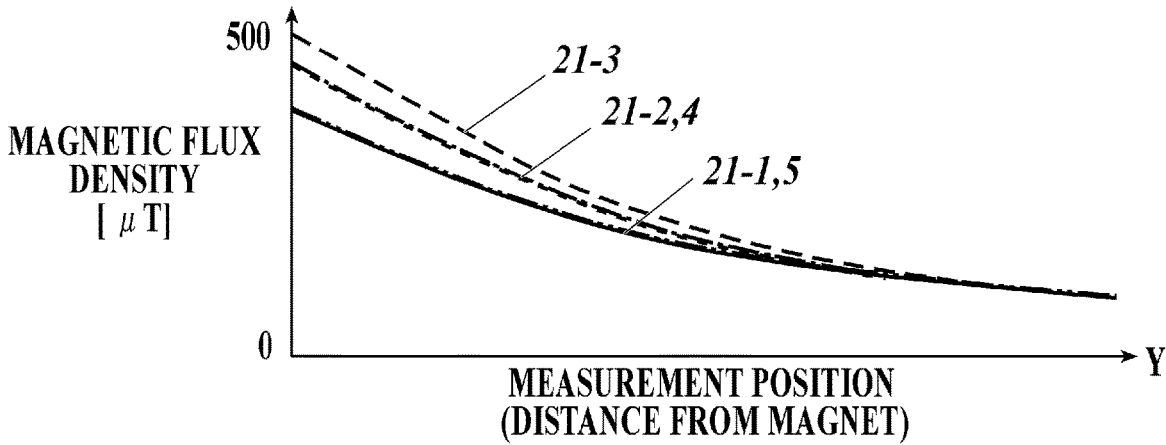
FIG. 12B shows distribution curves of magnetic field components in the Z-axis direction.

FIG. 10B, FIG. 11B, and FIG. 12B show the normalized virtual measurement data. The magnetic field shown by the virtual measurement data is mainly a magnetic field coming directly from the magnetic field source for measurement (3).

The information processing device (9) performs normalization such that the maximum value of the actual measurement data is equal to the maximum value of the virtual measurement data.

Figure 10C:
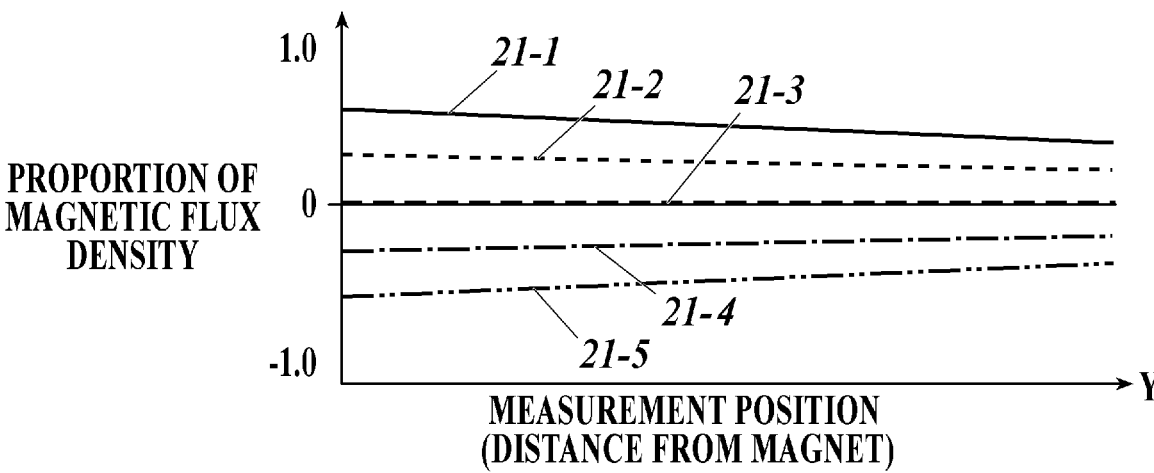
FIG. 10C shows distribution curves of magnetic field components in the X-axis direction.
Figure 11C:
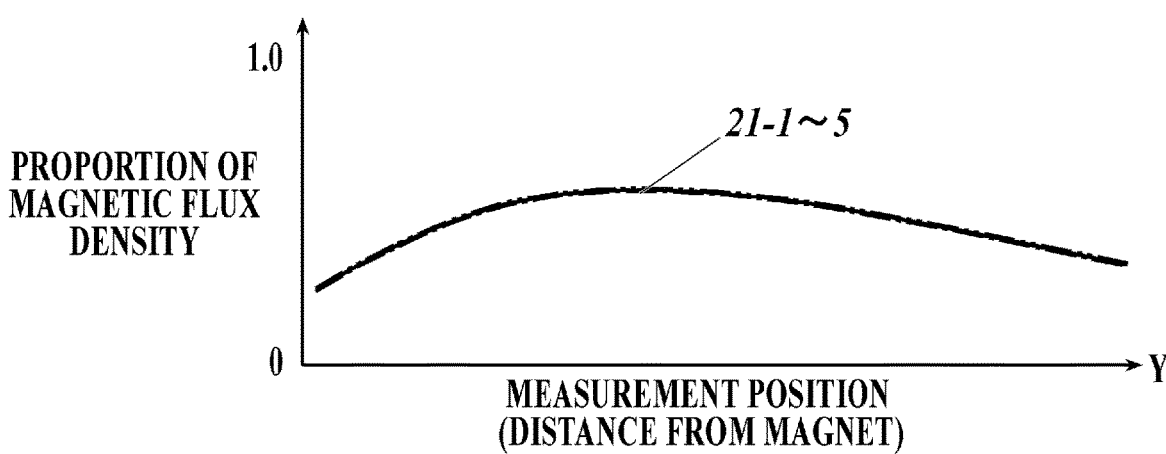
FIG. 11C shows distribution curves of magnetic field components in the Y-axis direction.
Figure 12C:
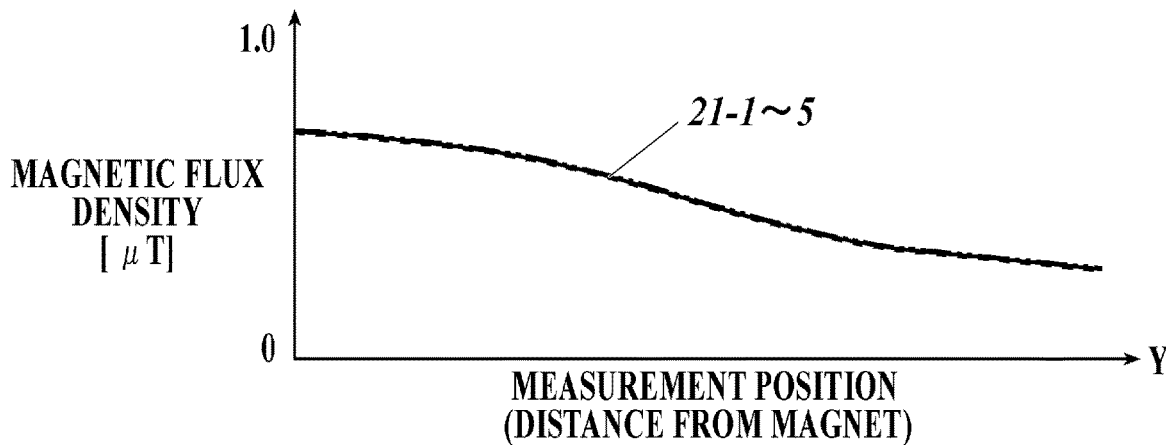
FIG. 12C shows distribution curves of magnetic field components in the Z-axis direction.

Next, the information processing device (9) subtracts measurement values of the normalized virtual measurement data from corresponding measurement values of the normalized actual measurement data. FIG. 10C, FIG. 11C, and FIG. 12C show measurement data after the subtraction process.

Under the actual measurement conditions, naturally the measurement target is present, and the actual measurement data includes effects of the measurement target. On the other hand, under the virtual conditions, the measurement target is absent. Therefore, in the measurement data after the subtraction process, noise magnetic field components (H2 in FIG. 13) that directly reach the magnetic sensors 21 from the magnetic field source for measurement (3) are reduced.

The noise magnetic field components are thus reduced.

More specifically, processing of removing components that directly reach the magnetic sensors 21 from the magnetic field application unit 3 is performed. As described above, whether a steel material (measurement target 8) is ruptured is determined by detecting the magnetic field that gradually leaks from the steel material while flowing in the steel material. The removing processing corrects a phenomenon in which: the magnetic field from the magnetic field application unit 3 does not flow to the steel material but directly reaches the magnetic sensors 21 through the area other than the steel material; and such undesired components decrease determination accuracy by being added to the measurement waveform.

(2) Reduction of Effects by Magnetic Material Other than Measurement Target

Figure 13:
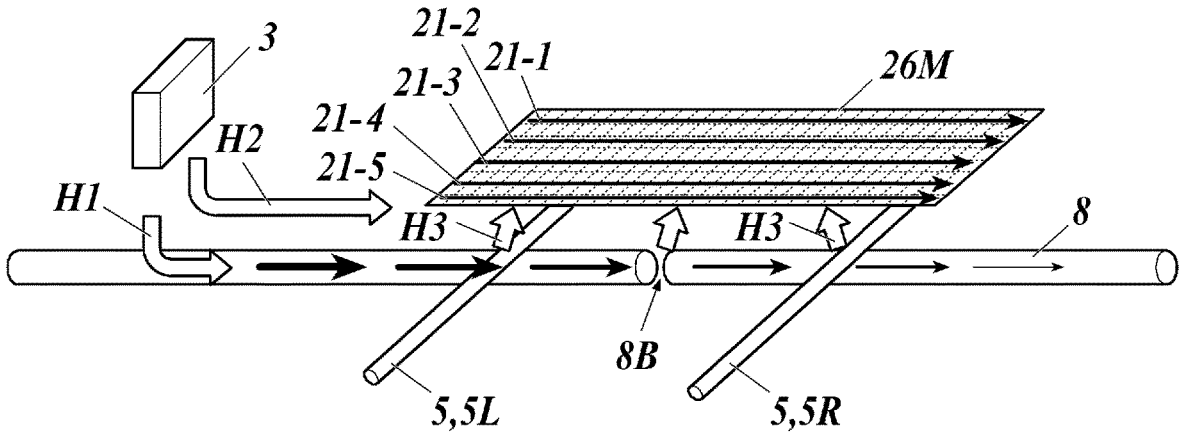
FIG. 13 shows the state of measurement when there is a crossing stirrup.

FIG. 13 shows factors expected in the actual measurement conditions.

The nonmagnetic material (e.g., concrete) covers the measurement target 8 (e.g., PC steel material) and a cross stirrup(s) 5. The cross stirrup 5 is the magnetic material 5 different from the measurement target 8.

The magnetic field application unit 3 is set on the surface of the nonmagnetic material and applies a magnetic field (H1) to the measurement target 8. The measurement target 8 is scanned with the magnetic sensors 21 along the longitudinal direction (Y direction) of the measurement target 8 such that the magnetic sensors 21 leave the magnetic field application unit 3. Herein, the sensor unit 2 has five magnetic sensors 21 in the X direction each of which detects components in three axis directions. The five magnetic sensors in the X direction are an example for easy explanation. There may be more than five magnetic sensors in the X direction.

The cross stirrup(s) 5 is positioned between the measurement target 8 and the surface of the nonmagnetic material on which the measurement surface 26M is set. There are multiple cross stirrups 5 that extend in the X direction and that are arranged next to each other in the Y direction.

The measurement target 8 has the rupture part 8B between two cross stirrups 5, 5, which are arranged in the Y direction.

Figure 14A:
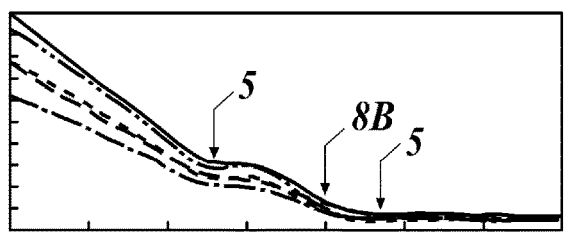
FIG. 14A shows distribution curves of magnetic field components in the Z-axis direction.

FIG. 14A shows magnetic field distribution curves that indicate the magnetic field distribution in the Z axis direction in the actual measurement data. The horizontal axis indicates positions in the Y direction. The magnetic field distribution curves have rapid drops caused by the rupture at the position of the rupture part 8B, as described above. However, the curves are deformed so as to project downwards by the magnetic fields coming from the cross stirrups 5, 5 positioned in front of and after the rupture part 8B. This makes it difficult to tell the difference. This may also cause a wrong determination that a rupture is present at the position of the cross stirrup 5.

Such deformation of waveforms caused by magnetic fields coming from the cross stirrups 5, 5 is removed through processing. In the processing, the virtual conditions and the actual measurement conditions are differentiated only in that the measurement target 8 is absent under the virtual conditions.

The information processing device (9) performs calculation on the basis of the virtual measurement data and the actual measurement data, and reduces, from the actual measurement data, noise magnetic field components (H3 in FIG. 13) that reach the magnetic sensors 21 from the magnetic field source for measurement (3) through the magnetic material 5 other than the measurement target. The virtual measurement data is created under virtual conditions that: the magnetic field source for measurement (3) that applies a magnetic field to the measurement target 8 is present but the measurement target 8 is absent in the actual measurement; and the magnetic material 5 other than the measurement target 8 is present in a nonmagnetic body as with in the actual measurement.

Figure 14B:
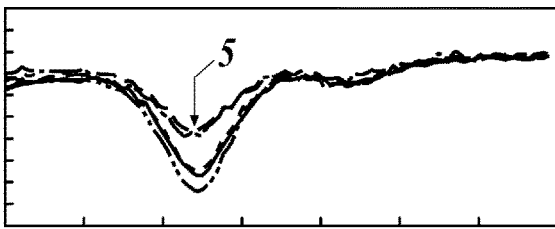
FIG. 14B shows distribution curves of magnetic field components in the Z-axis direction.

FIG. 14B shows an example of magnetic field waveforms having a downward projection at the position of the cross stirrup 5. The position of the cross stirrup 5 and the depth to the cross stirrup 5 in the Z direction are basically estimated on the basis of information obtained from an architectural plan, a survey using a commercially available electromagnetic radar, or measurement with the magnetic flux leakage testing. The position of the cross stirrup 5 may be estimated on the basis of characteristic components of a stirrup in the waveform obtained through measurement with the magnetic stream method (e.g., the components that appear periodically or the components that appear in X-axis direction).

The calculation can be done by subtracting the virtual measurement data from the actual measurement data, or more specifically, subtracting values obtained in the virtual measurement data from corresponding values obtained in the actual measurement data.

Under the actual measurement conditions, naturally the measurement target 8 and the cross stirrups 5 are present, and the actual measurement data includes effects of them. On the other hand, under the virtual conditions, the measurement target 8 is absent but the cross stirrups 5 are present. Therefore, in the measurement data after the subtraction processing, noise magnetic field components (H3 in FIG. 13) that reach the magnetic sensors 21 through the magnetic material 5 other than the measurement target 8 are reduced.

Figure 14C:
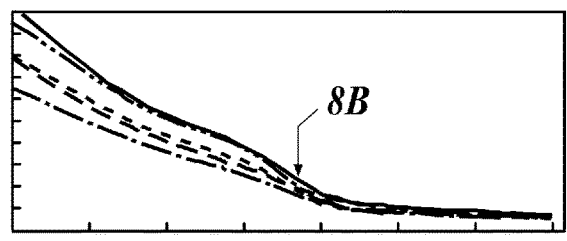
FIG. 14C shows distribution curves of magnetic field components in the Z-axis direction.

FIG. 14C shows magnetic field distribution curves on the basis of the measurement data after the calculation. The wave deformation components caused by the cross stirrups 5 are eliminated, so that a rapid attenuation point caused by the rupture part 8B can be easily detected.

Thus, the noise magnetic field components are reduced.

More specifically, signal components that reach the magnetic sensors 21 through a magnetic body other than the measurement target 8 (typically, cross stirrup) are removed through processing. When a magnetic body other than the steal material as the measurement target 8 is present within the measurement range, the magnetic body (5) absorbs the magnetic powers coming directly from the magnetic field application unit 3 or the magnetic powers passing through the steel material and releases the absorbed magnetic powers. This forms undesired magnetic fields around the magnetic body (5). The undesired magnetic fields, which are undesired components that interrupt detection, are added to the waveform detected by the sensors. These undesired components are estimated and subtracted/removed from the measured waveforms through processing.

(3) Extraction of Proportion (Level Adjusting)

Positions close to the magnetic field application unit 3 have intense signals, whereas positions far from the magnetic field application unit 3 have weak signals. The signal levels are therefore different.

FIG. 15A shows a curve representing the magnetic field distribution in the Z-axis direction with respect to positions in the Y-axis direction when the measurement target 8 is sound. At the side 15A close to the magnetic field application unit 3, values are not different because the magnetic forces are intense regardless of presence/absence of the measurement target 8. However, at positions farther from the magnetic field application unit 3, the measurement result in which the measurement target 8 is present have greater values. For example, values in the case where the measurement target 8 is present are approximately twice as great as values in the case where the measurement target 8 is absent.

When the measurement target 8 is present, the measurement target 8 transmits magnetic powers. In the range 15B where the measurement positions are sufficiently far from the magnetic field application unit 3, the magnetic force eventually becomes zero regardless of the presence/absence of the measurement target 8. The values therefore approaches 1.

FIG. 15B shows a curve representing the magnetic field distribution in the Z-axis direction with respect to positions in the Y-axis direction when the measurement target 8 has the rupture part 8B. As the magnetic forces do not flow after the rupture part 8B, the curve rapidly approaches 1.

In this processing, dynamic ranges are adjusted so that the waveform in the region closer to the magnetic field application unit 3 and the waveform in the region farther from the magnetic field application unit 3 are displayed as having the same change rates.

The information processing device (9) performs calculation on the basis of the virtual measurement data and the actual measurement data to calculate the proportion of the magnetic field that is increased owing to the presence of the measurement target 8 in the actual measurement data. The virtual measurement data is created under virtual conditions that: the magnetic field source for measurement (3) that applies a magnetic field to the measurement target 8 is present but the measurement target is absent in the actual measurement. The virtual conditions are different from the actual measurement conditions only in that the measurement target 8 is absent under the virtual conditions.

Firstly, the information processing device (9) normalizes the actual measurement data and the virtual measurement data such that the maximum measurement values become equal between the actual measurement data and the virtual measurement data.

The information processing device (9) then smooths the curve of the actual measurement data.

The information processing device (9) then subtracts the virtual measurement data from the actual measurement data.

FIG. 16A shows curves representing the magnetic field distribution with respect to positions in the Y-axis direction after the above-described processing. FIG. 16A shows the case where the measurement target 8 is sound. FIG. 16B shows curves representing the magnetic field distribution with respect to positions in the Y-axis direction after the above-described processing. FIG. 16B shows the case where the measurement target 8 has the rupture part 8B. As a result of the subtraction, values may be greater than 1 when the magnetic field from the measurement target 8 is greater than the direct magnetic field from the magnetic field application unit 3.

FIG. 16 and FIG. 17 show magnetic field components in the Z-axis direction.

FIG. 17 shows curves after the normalization processing in which the minimum value is zero and the maximum value is 1.

Figure 17A:
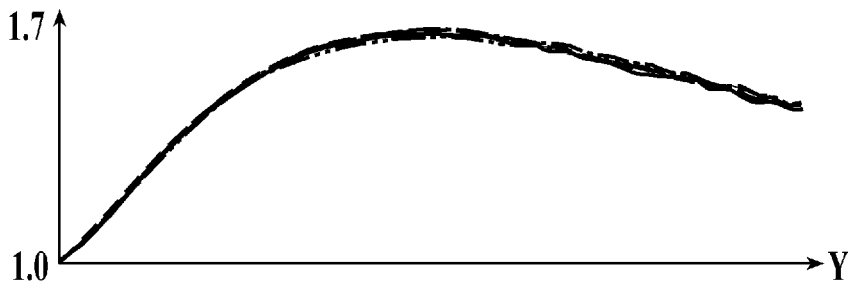
FIG. 17A shows distribution curves of magnetic field components in the Z-axis direction.
Figure 17B:
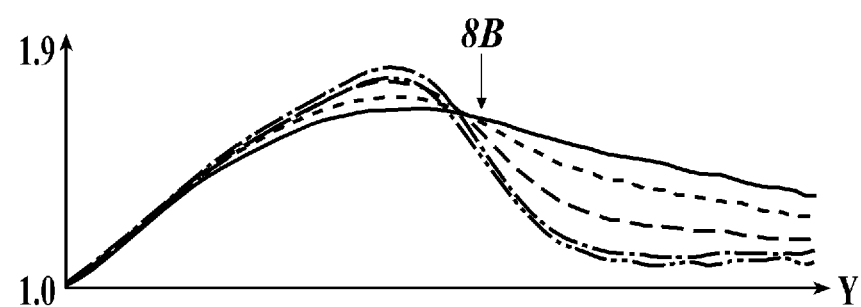
FIG. 17B shows distribution curves of magnetic field components in the Z-axis direction.

More specifically, FIG. 17A shows curves representing the magnetic field distribution with respect to positions in the Y-axis direction after the normalization processing. FIG. 17A shows the case where the measurement target 8 is sound. FIG. 17B shows curves representing the magnetic field distribution with respect to positions in the Y-axis direction after the normalization processing. FIG. 17B shows the case where the measurement target 8 has the rupture part 8B.

FIG. 17 shows the proportion of the magnetic field increased by the presence of the measurement target 8 in the actual measurement data.

As described above, the information processing device 9 shows the proportion of the magnetic field increased by the presence of the measurement target 8 regardless of the distance from the magnetic field application unit 3. Thus, the information processing device 9 can emphasize the magnetic field components coming from the measurement target. The farther the measurement position is from the magnetic field application unit 3, the more the magnetic field components are emphasized.

(4) Processing of Emphasizing Characteristic Waveform (Extracting Differential Waveform)

The information processing device (9) performs processing of emphasizing a characteristic waveform(s) by utilizing characteristics of the measurement data on the measurement target 8. By doing so, the information processing device (9) makes it easier to judge the measurement result.

Judgement on the presence of a rupture/breakage may be done based on at least one of the following: whether the waveform of magnetic field components in the X-axis direction narrows; whether the waveform of magnetic field components in the Y-axis direction has a peak projecting upwards; and whether the waveform of magnetic field components in the Z-axis direction rapidly attenuates.

The information processing device (9) obtains differential values of waveforms representing magnetic field components in the respective X, Y, and Z axis directions. The information processing device (9) also judges that a part having a value exceeding a predetermined threshold may be a rupture, and displays the judgement.

As shown in FIG. 13, five sensors arranged in the X-axis direction are magnetic sensors 21-1 to 21-5.

FIG. 18 to FIG. 20 are based on the measurement data obtained by the magnetic sensor 21-1. FIG. 18 to FIG. 20 show curves representing the magnetic field distribution with respect to positions in the Y-axis direction. FIG. 18A, FIG. 18B, FIG. 19A, FIG. 19B, FIG. 20A, and FIG. 20B show the case where the measurement target 8 is sound. FIG. 18C, FIG. 18D, FIG. 19C, FIG. 19D, FIG. 20C, and FIG. 20D show the case where the measurement target 8 has the rupture part 8B. FIG. 18A shows the waveform representing magnetic components in the X-axis direction of the actual measurement data. FIG. 18B shows the differential waveform of FIG. 18A. FIG. 18C shows the waveform representing magnetic components in the X-axis direction of the actual measurement data. FIG. 18D shows the differential waveform of FIG. 18C. FIG. 19A shows the waveform representing magnetic components in the Y-axis direction of the actual measurement data. FIG. 19B shows the differential waveform of FIG. 19A. FIG. 19C shows the waveform representing magnetic components in the Y-axis direction of the actual measurement data. FIG. 19D shows the differential waveform of FIG. 19C. FIG. 20A shows the waveform representing magnetic components in the Z-axis direction of the actual measurement data. FIG. 20B shows the differential waveform of FIG. 20A. FIG. 20C shows the waveform representing magnetic components in the Z-axis direction of the actual measurement data. FIG. 20D shows the differential waveform of FIG. 20C.

Figure 18A:
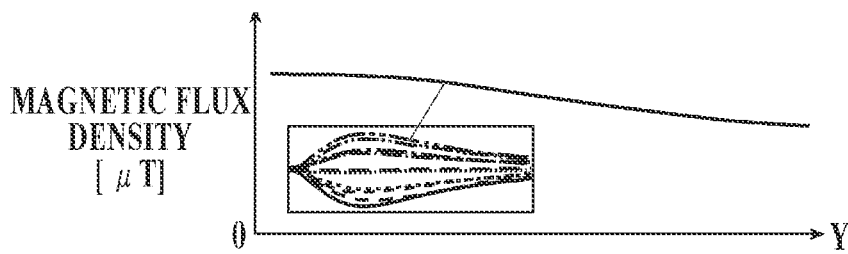
FIG. 18A shows distribution curves of magnetic field components in the X-axis direction.
Figure 18B:
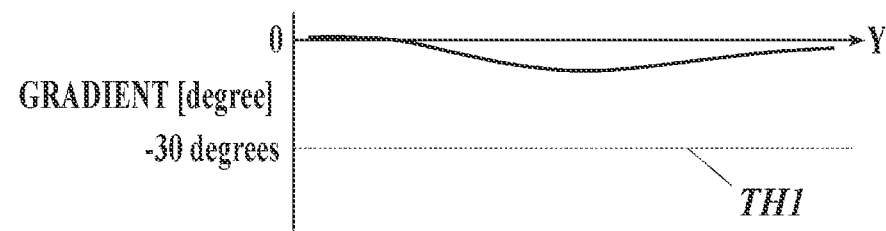
FIG. 18B shows differential waveforms of the distribution curves in FIG. 18A.
Figure 18C:
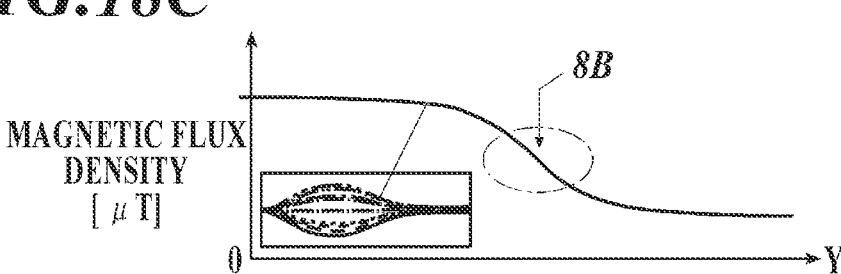
FIG. 18C shows distribution curves of magnetic field components in the X-axis direction.
Figure 18D:
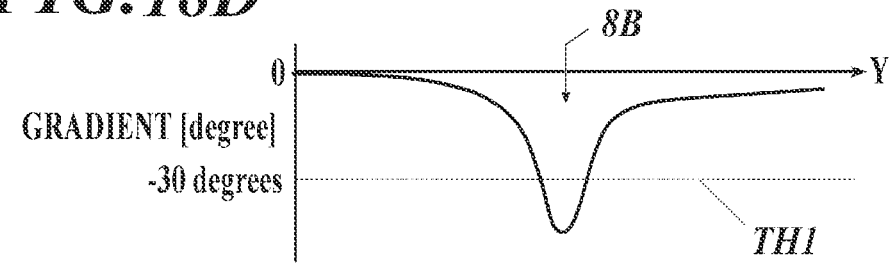
FIG. 18D shows differential waveforms of the distribution curves in FIG. 18C.

As shown in FIG. 18D, the X-axis direction components conspicuously change owing to the rupture part 8B. In the sound case (FIG. 18B), the curve is above a threshold TH1, whereas in FIG. 18D, the curve falls below the threshold TH1. Based on this, the information processing device (9)

can determine that there may be a rupture. The threshold TH1 is −30 degrees of gradient in the figures as an example.

Figure 19A:
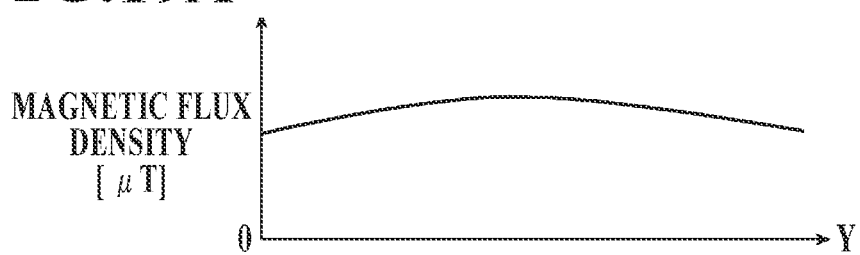
FIG. 19A shows distribution curves of magnetic field components in the Y-axis direction.
Figure 19B:
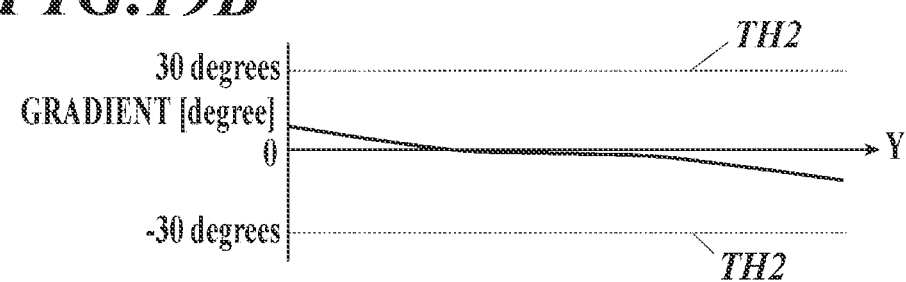
FIG. 19B shows differential waveforms of the distribution curves in FIG. 19A.
Figure 19C:
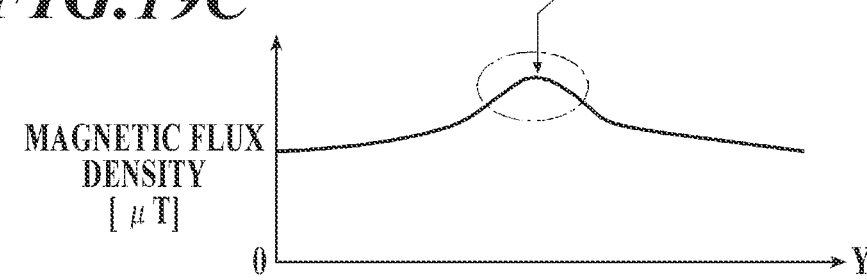
FIG. 19C shows distribution curves of magnetic field components in the Y-axis direction.
Figure 19D:
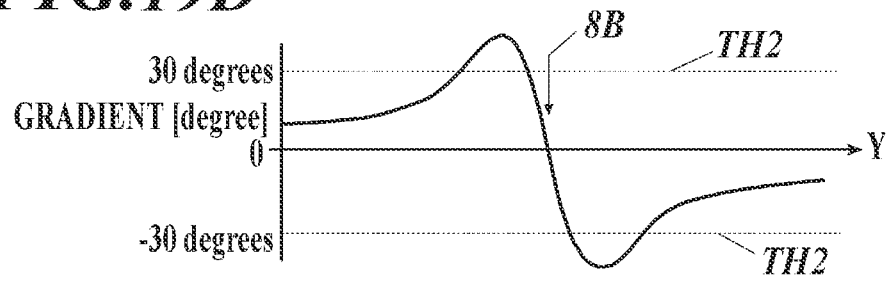
FIG. 19D shows differential waveforms of the distribution curves in FIG. 19C.

As shown in FIG. 19D, the Y-axis direction components conspicuously change owing to the rupture part 8B. In the sound case (FIG. 19B), the curve does not exceed or fall below a threshold TH2, whereas in FIG. 19D, the curve exceeds and falls below the threshold TH2. Based on this, the information processing device (9) can determine that there may be a rupture. The thresholds TH2 is +30 degrees of gradient in the figures as an example.

Figure 20A:
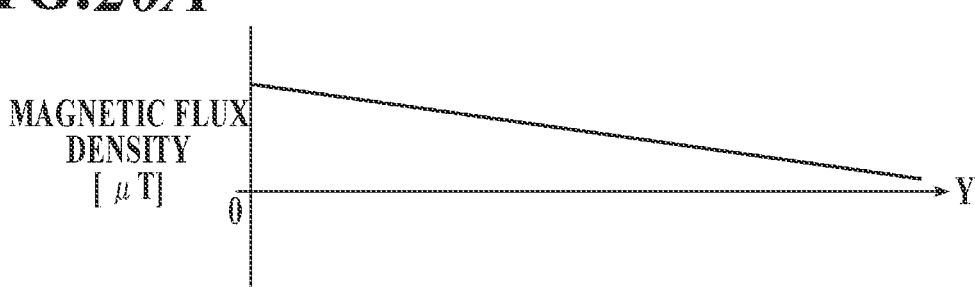
FIG. 20A shows distribution curves of magnetic field components in the Z-axis direction.
Figure 20B:
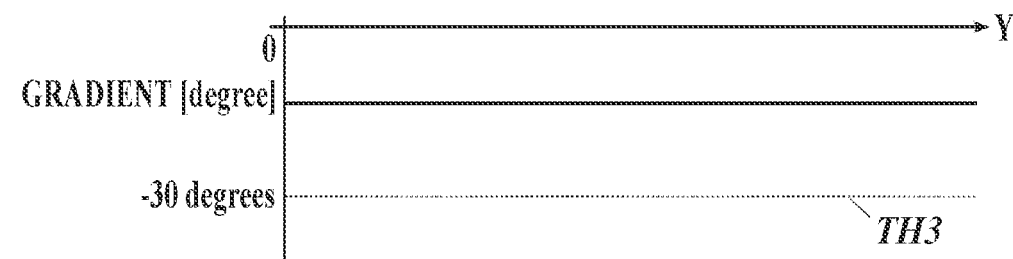
FIG. 20B shows differential waveforms of the distribution curves in FIG. 20A.
Figure 20C:
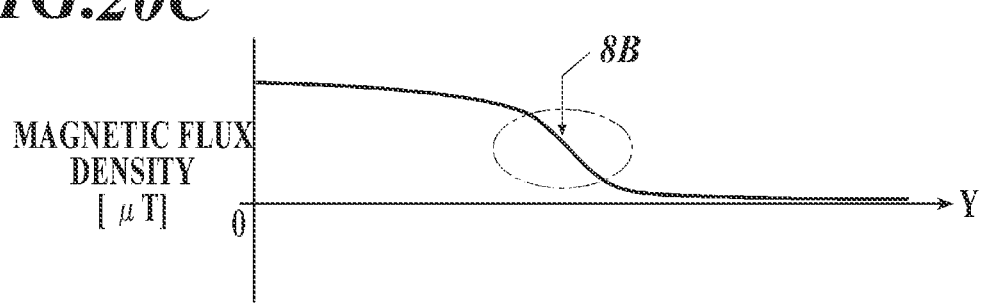
FIG. 20C shows distribution curves of magnetic field components in the Z-axis direction.
Figure 20D:
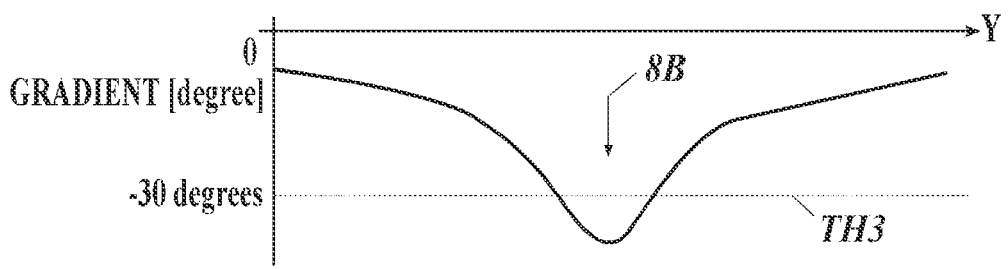
FIG. 20D shows differential waveforms of the distribution curves in FIG. 20C.

As shown in FIG. 20D, the Z-axis direction components conspicuously change owing to the rupture part 8B. In the sound case (FIG. 20B), the curve does not fall below a threshold TH3, whereas in FIG. 20D, the curve falls below the threshold TH3. Based on this, the information processing device (9) can determine that there may be a rupture. The thresholds TH3 is −30 degrees of gradient in the figures as an example.

(5) Processing for Judgement Based on Magnetic Components Coming from Cross Stirrup Whether the measurement target is damaged may be judged on the basis of levels of signal changes caused by magnetic components coming from the cross stirrup 5.

When the measurement target 8 has the rupture part 8B, signals coming from cross stirrups positioned after the rupture part 8B are smaller as compared with the case where there is no rupture. This fact is utilized in this section. Therefore, in this section, the processing of removing cross stirrup signals described in the above (2) is not performed.

Assume that two cross stirrups 5, 5 are arranged next to each other in the Y-axis direction, as shown in FIG. 13. Further assume that, when the measurement target 8 is sound, the amplitude of the waveform of the right cross stirrup 5 attenuates by 1% per 1 cm from the position of the left cross stirrup 5L, as compared with the amplitude of the waveform of the left cross stirrup 5L. The ratio of attenuation to distance (1% per 1 cm) is an example.

When the measurement target 8 has the rupture part 8B, the ratio of attenuation to distance increases.

When the ratio of attenuation to distance is less than 1%/1 cm, the information processing device (9) determines that the rupture part 8B is present between the left and right cross stirrups 5L, 5R.

The processing is described with reference to FIG. 21.

FIG. 21 shows curves representing distribution of magnetic field components in the Z-axis direction with respect to the Y axis. FIG. 21A, FIG. 21B, and FIG. 21C show the case where the measurement target 8 is sound. FIG. 21D, FIG. 21E, and FIG. 21F show the case where the measurement target 8 has the rupture part 8B. FIG. 21A and FIG. 21D show the case where there is no cross stirrup. FIG. 21B and FIG. 21E show the case where there are cross stirrups.

Figure 21A:
FIG. 21A shows distribution curves of magnetic field components in the Z-axis direction.
Figure 21B:
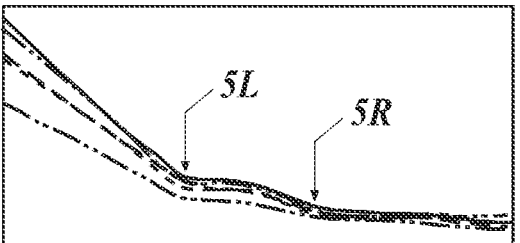
FIG. 21B shows distribution curves of magnetic field components in the Z-axis direction.
Figure 21C:
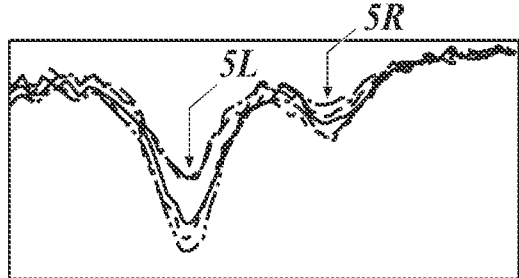
FIG. 21C shows distribution curves of magnetic field components in the Z-axis direction.
Figure 21D:
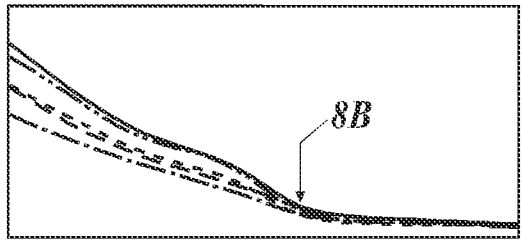
FIG. 21D shows distribution curves of magnetic field components in the Z-axis direction.

The information processing device (9) subtracts the waveform without cross stirrup (FIG. 21A) from the waveform with cross stirrups (FIG. 21B). The result of subtraction is shown in FIG. 21C. As shown in FIG. 21C, the magnetic field attenuates at the position of the right cross stirrup 5R as compared with the position of the left cross stirrup 5L according to the constant ratio of attenuation to distance. The magnetic field caused by the cross stirrup has the minus polarity, and is shown as a downward projection in the graph. The size of the downward projection at the right cross stirrup 5R is smaller than the downward projection at the left cross stirrup 5L.

Figure 21E:
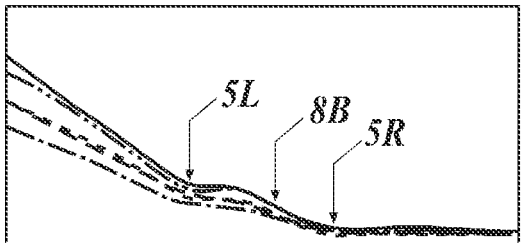
FIG. 21E shows distribution curves of magnetic field components in the Z-axis direction.
Figure 21F:
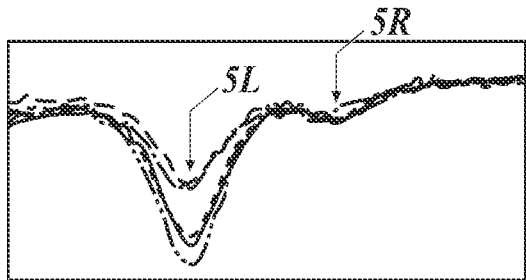
FIG. 21F shows distribution curves of magnetic field components in the Z-axis direction.

Similarly, in the case where the rupture is present, the information processing device (9) subtracts the sound waveform without cross stirrup (FIG. 21D) from the waveform with cross stirrups (FIG. 21E) as well. The subtraction result is shown in FIG. 21F.

As compared with FIG. 21C, the size of the downward projection at the right cross stirrup 5R is further smaller than the downward projection at the left cross stirrup 5L.

The information processing device (9) detects such a decrease through threshold processing to determine that the rupture part 8B is present between the left and right cross stirrups 5L, 5R.

The information processing device (9) determines that the steel material is ruptured before the right cross stirrup 5R when the amplitude of the magnetic field at the right cross stirrup 5R is smaller as compared with the normal case.

As described above, the information processing device (9) performs calculation on the basis of the virtual measurement data of the sound case (FIG. 21B or FIG. 21C) and the actual measurement data (FIG. 21E or FIG. 21F) to compare the actual measurement data with the virtual measurement data of the sound case (FIG. 21B or FIG. 21C). The information processing device (9) thus detects, in the actual measurement data, decrease in magnetic field components owing to a breakage of the measurement target 8, the magnetic field components reaching the magnetic sensors 21 from the magnetic field source for measurement (3) through the magnetic material 5 other than the measurement target. The virtual measurement data is created under the virtual conditions that: the magnetic field source for measurement (3) that applies a magnetic field to the measurement target 8 is present in actual measurement; the measurement target 8 is sound; and the magnetic material 5 other than the measurement target 8 is present in the nonmagnetic body as with in actual measurement (FIG. 21E).

Thus, the information processing device (9) emphasizes magnetic field components that are coming from the measurement target and that are measurable through the cross stirrups 5.

The information processing device (9) may not detect the above-described decrease. The information processing device (9) may display the data in which the amplitude of the magnetic field at the cross stirrup 5 is emphasized in the actual measurement data (i.e., display the waveform as shown in FIG. 21F). Then, a user who knows the degree of decrease in a sound case may judge the degree of decrease.

(6) Smoothing Processing

The information processing device (9) smooths the curve of the actual measurement data that distributes along the measurement target 8.

In the smoothing processing, the exponential moving average is used for calculation, for example.

This smoothing processing is applied to the above-described (3) smoothing. It is basically preferable that this smoothing processing be applied to the actual measurement data.

When the steel material as the measurement target 8 is positioned relatively deep in the Z-axis direction, the waveform of the rupture in the steel material has low frequencies. On the other hand, sensor noise and noise from foreign substances on the concrete surface have high frequencies. On the basis of these characteristic difference, low-pass filtering (e.g., moving average) is performed in this section, so that unsmoothness of the high-frequency waveform can be reduced.

(7) Correction of Axis Misalignment

The information processing device (9) utilizes the characteristics of the measurement data on the measurement target 8 to correct axis misalignment between the measurement target 8 and the measurement device (sensor unit 2), which is caused by the relative positional relationship between the measurement target 8 and the sensor unit 2. This makes it easy to judge the measurement result.

As an algorithm for correcting axis misalignment, the X-axis direction positions (width direction of measurement surface) of the measurement data are corrected on the assumption that the center line of the measurement surface 26M is the center between edge lines of the measured surface.

Figure 22A:
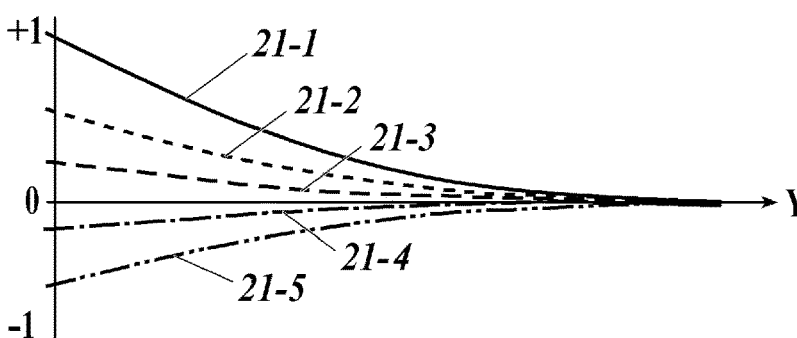
FIG. 22A shows distribution curves of magnetic field components in the X-axis direction.

FIG. 22 shows curves representing distribution of magnetic components in the X-axis direction with respect to positions in the Y axis direction. FIG. 22A shows actual measurement data that has axis misalignment. Uniformity of measurement data can be retained by scanning the measurement target 8 such that the central magnetic sensor 21-3 runs right above the central axis of the measurement target 8. In the case, the magnetic components in the X-axis direction right above the central axis of the measurement target 8 is zero. Therefore, values measured by the central magnetic sensor 21-3 is uniformly zero. However, each measurement may have an error due to the positioning of the sensor unit 2. As shown in FIG. 22A, the values measured by the central magnetic sensor 21-3 are not zero. This is because the central magnetic sensor 21-3 is shifted in the X-axis direction from the position right above the central axis of the measurement target 8. In FIG. 22A, the central magnetic sensor 21-3 is shifted toward the magnetic sensors 21-1, 21-2. As a result of this, the absolute values measured by the magnetic sensors 21-1, 21-2 are greater, whereas the absolute values measured by the opposite magnetic sensors 21-4, 21-5 are smaller. The magnetic sensors are thus shifted as a whole.

Figure 22B:
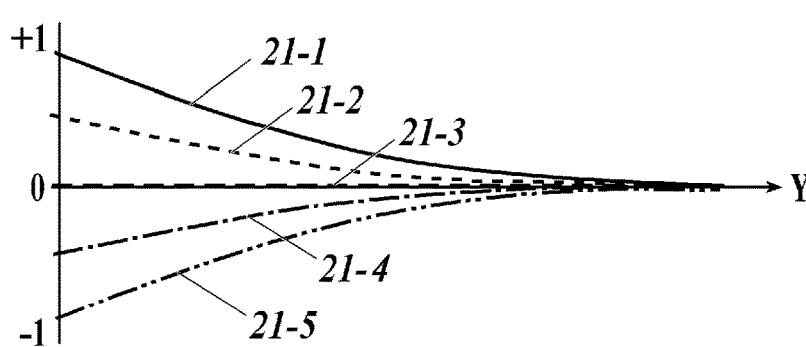
FIG. 22B shows distribution curves of magnetic field components in the X-axis direction.

As described above, the measurement line of the central magnetic sensor 21-3 is shifted from the central line (0 line). The information processing device (9) shifts values measured by all the magnetic sensors 21-1 to 21-5 based on the ratio according to the horizontal axis coordinates (Y-axis coordinates) such that the measurement line of the central magnetic sensor 21-3 corresponds to the central line (0 line). Thus, the information processing device (9) adjusts the data such that all the measurement lines are symmetry with respect to the central line (0 line). As a result of correcting the axis misalignment, measurement lines as shown in FIG. 22B as a whole can be obtained.

Figure 23A:
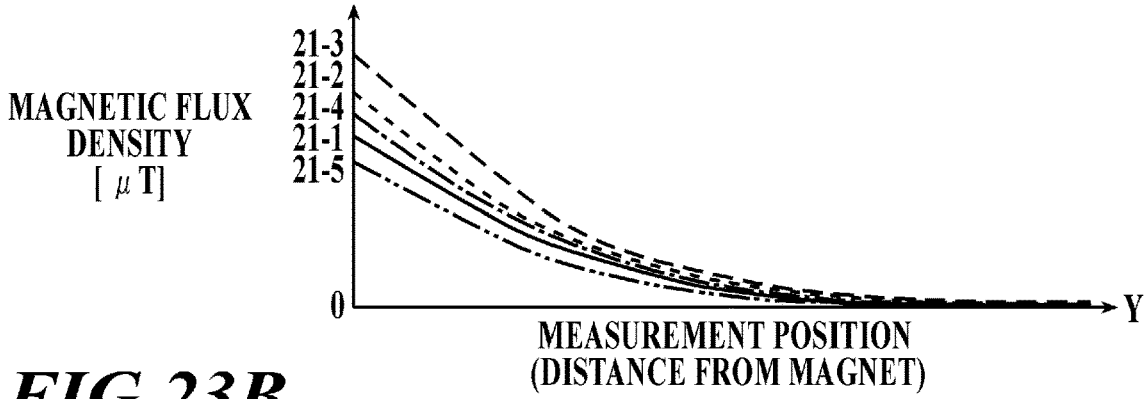
FIG. 23A shows distribution curves of magnetic field components in the Y-axis or Z-axis direction.

FIG. 23 shows curves representing distribution of magnetic components in the Y-axis or Z-axis direction with respect to positions in the Y axis direction. FIG. 23A shows actual measurement data that has axis misalignment.

In an ideal case where no axis misalignment occurs, with respect to the magnetic components in the Y-axis or Z-axis direction, the central magnetic sensor 21-3 should have the maximum values, and two magnetic sensors 21-1 and 21-5 that are at an equal distance from the center should have equal values. Further, the other two magnetic sensors 21-2 and 21-4 that are at an equal distance from the center should have equal values as well.

However, values measured by the respective sensors are shifted owing to axis misalignment, as shown in FIG. 23A.

Figure 23B:
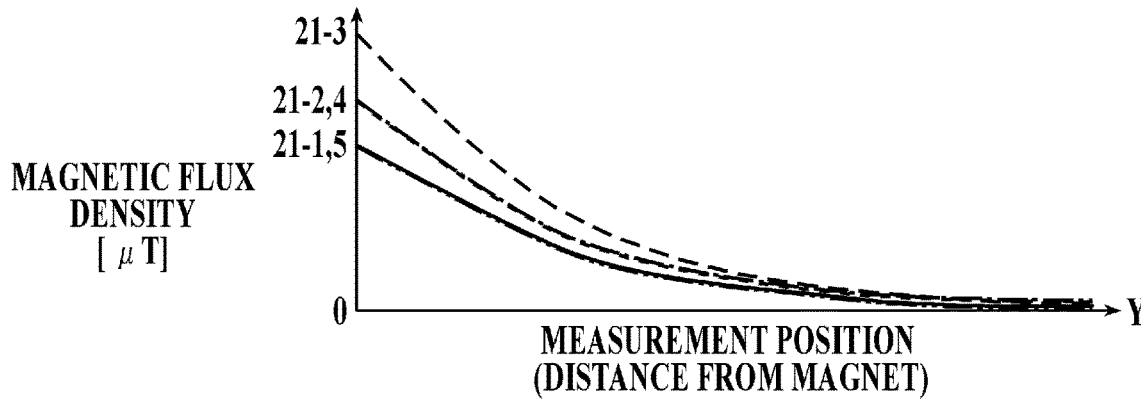
FIG. 23B shows distribution curves of magnetic field components in the Y-axis or Z-axis direction.

The information processing device (9) supposes an upward-convex curve that represents distribution in the X-axis direction and that crosses measurement values of all the sensors. The information processing device (9) shifts the measurement values such that the measurement value of the central magnetic sensor 21-3 corresponds to the peak of the curve and the measurement values of two magnetic sensors 21-1 and 21-5 (21-2 and 21-4) at an equal distance from the center are equal to each other. Thus, the information processing device (9) corrects the data so that the data has an ideal symmetric balance, as shown in FIG. 23B.

As described above, the information processing device (9) corrects shift of the central axis in the actual measurement data from the central axis of the measurement target, on the basis of the symmetry in distribution of the two-dimensional (X-Y) magnetic field with respect to the central axis of the measurement target 8.

Thus, errors caused by the positioning of the measurement device are removed to obtain uniform data. This makes it easy to judge whether a breakage is present in the measurement target.

(8) Reduction of Time-Varying Ambient Magnetic Noise

The sensor unit 2 may include a fixed magnetic sensor 28.

The fixed magnetic sensor 28 is fixed at a certain position when the magnetic sensor 21 moves for scanning. The fixed magnetic sensor 28 may not be fixed to the sensor unit 2. The fixed magnetic sensor 28 may be fixed at the measurement site while actual measurement data is obtained.

Figure 24:
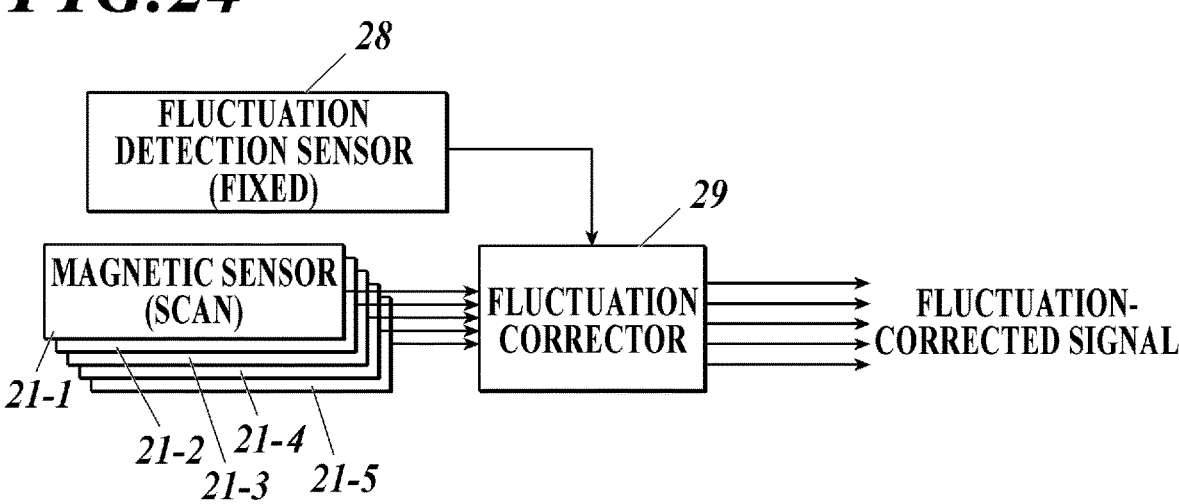
FIG. 24 is a block diagram showing correction of fluctuations caused by time-varying ambient magnetic field noise.

FIG. 24 is a block diagram for correcting fluctuations caused by time-varying ambient magnetic field noise. As the position of the fixed magnetic sensor 28 is unchanged, the magnetic sensor 28 detects fluctuations caused by time-varying ambient magnetic field noise.

Figure 25A:
FIG. 25A shows actual measurement data including fluctuation components.
Figure 25B:
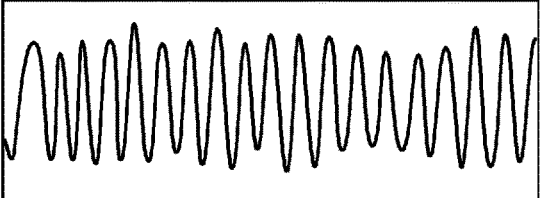
FIG. 25B shows measurement data including fluctuations and detected by a fixed magnetic sensor.
Figure 25C:
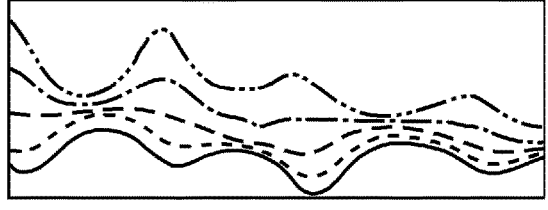
FIG. 25C shows measurement data after the fluctuations are removed.

The information processing device (9) includes a fluctuation corrector 29. On the basis of measurement data having fluctuations (FIG. 25B) detected by the fixed magnetic sensor 28, the fluctuation corrector 29 corrects actual measurement data (FIG. 25A) obtained by the movable scanning magnetic sensors 21-1 to 21-5 such that the fluctuations are removed from the actual measurement data. Thus, measurement data from which fluctuations are removed (FIG. 25C) is obtained.

Thus, fluctuations caused by time-varying ambient magnetic field noise (e.g., noise from overhead wiring of railways) can be eliminated. For example, bullet trains are driven by AC power at 60 Hz, and electric currents flowing through the overhead wiring and rails cause ambient magnetism changes at 60 Hz. Fluctuations caused by these changes can be removed.

As described above, noise magnetic field components other than magnetic field components coming from the measurement target are reduced in actual measurement data.

(9) Example of Processing Result

As described above, magnetic field components coming from the measurement target are visualized by reducing noise magnetic field components and/or emphasizing magnetic field components coming from the measurement target. FIG. 26 to FIG. 28 shows an example of the processing result. In the example, no cross stirrups are present in actual measurement, and the above (1), (3), (6), (7), and (8) are performed.

Figure 28A:
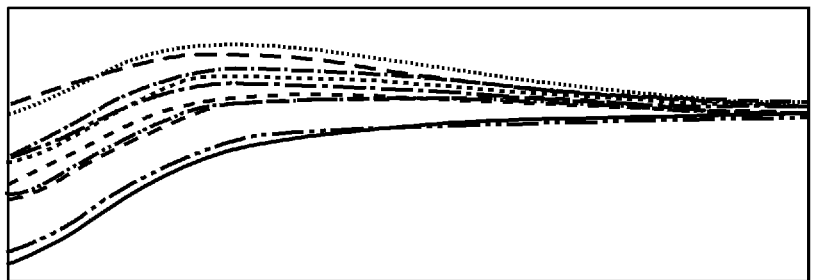
FIG. 28A shows distribution curves of magnetic field components in the Z-axis direction as an example of a processing result of visualizing magnetic field components coming from the measurement target.
Figure 28B:
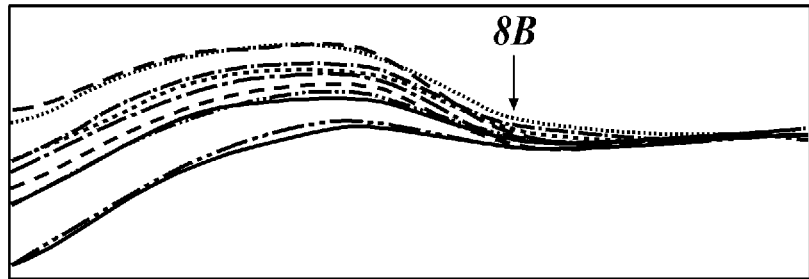
FIG. 28B shows distribution curves of magnetic field components in the Z-axis direction as an example of a processing result of visualizing magnetic field components coming from the measurement target.

FIG. 26 shows magnetic field components in the X-axis direction. FIG. 27 shows magnetic field components in the Y-axis direction. FIG. 28 shows magnetic field components in the Z-axis direction. The horizontal axis indicates positions in the Y direction. FIG. 26A, FIG. 27A, and FIG. 28A show the case where the measurement target 8 is sound. FIG. 26B, FIG. 27B, and FIG. 28B show the case where the measurement target 8 has the rupture part 8B.

The rupture part 8B is represented by narrowing X-axis components in FIG. 26, projecting peaks of Y-axis components in FIG. 27, and attenuation of Z-axis components in FIG. 28. These characteristics are conspicuous as compared with the case where the measurement target 8 is sound. This makes it easy to judge whether a breakage is present in the measurement target 8.

According to the above embodiment, the magnetic field application unit 3 may be arranged only at one side of the magnetic sensors 21. This reduces the size and weight of the nondestructive inspection device 1. This also enables measuring all parts of the measurement target structure including the exterior nonmagnetic body. Further, in performing measurement by consecutively changing measurement positions, there is no other magnet that magnetizes earlier, and measurement and moving measurement positions can be done while keeping a predetermined relative position between the magnetic field application unit and the magnetic sensors as one body. This allows a user without high skills to efficiently repeat accurate and stable measurement.

Further, by the above-described data processing, magnetic field components coming from the measurement target are visualized. This makes it easy to determine whether a breakage is present in the measurement target.

The above embodiment is not a limitation. The hardware configuration of the information processing device that performs processing for visualizing magnetic field components coming from the measurement target is not limited to the cloud computer 9. The information processing device may be a computer that is connected one-to-one to the nondestructive inspection device 1 or a computer that is integrated with the nondestructive inspection device, for example. It is advantageous to use one cloud computer 9 for performing processing in terms of collection of information, uniformity of processing, and usability.

In the above embodiment, the magnetic sensors 21 perform scanning in the Y direction and are a sensor array in the X direction. However, the magnetic sensors 21 may be sensor arrays in the Y direction as well. More specifically, the sensor unit 2 may include multiple magnetic sensors 21 arranged in the first direction (Y direction) on the casing 26 so that magnetic field distribution along the first direction (Y direction) is obtained according to the distance from the magnetic field application unit 3. In the case, the above processing (8) is not required.

Further, the sensor unit 2 may be configured to perform scanning in the X and Y directions.

In the above embodiment, two-dimensional data having multiple columns in the X and Y directions is obtained. However, one-dimensional data having one column in the Y direction may be obtained when the X direction is omitted depending on processing contents.

Further, there may not be two magnetic sensors 21 in the Z direction. There may be only one magnetic sensor (main sensor) in the Z direction.

INDUSTRIAL APPLICABILITY

The present invention is applicable to an information processing system for nondestructive inspection and nondestructive inspection method.

REFERENCE SIGNS LIST

1 Nondestructive inspection device
2 Sensor unit
3 Magnetic field application unit
5 Cross stirrup
8 Measurement target
8B Rupture part
9 cloud computer (information processing device)
10 Nondestructive inspection system
21 Magnetic sensor
21M Main sensor
21R Reference sensor
25 Operation receiver
26 Casing
27 Sensor scan mechanism

The invention claimed is:

1. An information processing system for nondestructive inspection of a measurement target that is a magnetic material covered by a nonmagnetic body, the information processing system comprising:
    a sensor unit including a casing with a measurement surface, a sensor array with one or more magnetic sensors, and a sensor scan mechanism driven by a motor; and
    an information processing device that reduces noise magnetic field components other than magnetic field components coming from the measurement target and/or emphasizes the magnetic field components coming from the measurement target in actual measurement data, which includes reducing the noise magnetic field components in the actual measurement data coming from a magnetic material other than the measurement target, based on the actual measurement data and virtual measurement data, wherein
    the actual measurement data is obtained by applying a magnetic field to the measurement target and actually measuring the magnetic field coming from the measurement target using the one or more magnetic sensors at a measurement position on a surface of the nonmagnetic body, the one or more magnetic sensors including at least one main sensor and at least one reference sensor corresponding, respectively, to the at least one main sensor, the at least one reference sensor being disposed further away from the measurement surface than the corresponding at least one main sensor,
    the virtual measurement data is created by performing a simulation under virtual conditions that are obtained by modifying actual measurement conditions, the virtual conditions account for the magnetic material other than the measurement target by estimating a position of the magnetic material other than the measurement target on the basis of information obtained from an architectural plan, a survey using electromagnetic radar, or measurement with magnetic flux leakage testing.

2. The information processing system for nondestructive inspection according to claim 1,
    wherein the information processing device reduces the noise magnetic field components in the actual measurement data that directly reach the one or more magnetic sensors from a magnetic field source for measurement by performing a calculation based on the actual measurement data and the virtual measurement data,
    wherein the virtual measurement data is created under the virtual conditions in which:
        the magnetic field source for measurement that applies the magnetic field to the measurement target is present as in the actual measurement; and
        the measurement target is absent.

3. The information processing system for nondestructive inspection according to claim 1,
    wherein the virtual measurement data is created under the virtual conditions in which:
        a magnetic field source for measurement that applies the magnetic field to the measurement target is present as in the actual measurement;

the measurement target is absent; and the magnetic material other than the measurement target is present in the nonmagnetic body as with in the actual measurement.

4. The information processing system for nondestructive inspection according to claim 1, wherein the information processing device extracts a proportion of the magnetic field increased by presence of the measurement target in the actual measurement data by performing a calculation based on the actual measurement data and the virtual measurement data, wherein the virtual measurement data is created under the virtual conditions in which:

a magnetic field source for measurement that applies the magnetic field to the measurement target is present as in the actual measurement; and the measurement target is absent.

5. The information processing system for nondestructive inspection according to claim 1, wherein the information processing device differentiates a curve that represents the actual measurement data distributed along the measurement target.

6. The information processing system for nondestructive inspection according to claim 1, wherein the information processing device detects a decrease of the magnetic field components in the actual measurement data that come from a magnetic field source for measurement and that reach the one or more magnetic sensors through the magnetic material other than the measurement target by performing a calculation based on the actual measurement data and the virtual measurement data, the decrease being caused by a breakage in the measurement target, wherein the virtual measurement data is created under the virtual conditions in which:

the magnetic field source for measurement that applies the magnetic field to the measurement target is present as in the actual measurement;

the measurement target is sound; and the magnetic material other than the measurement target is present in the nonmagnetic body as with in the actual measurement.

7. The information processing system for nondestructive inspection according to claim 1, wherein the information processing device smooths a curve of the actual measurement data that is distributed along the measurement target.

8. The information processing system for nondestructive inspection according to claim 1, wherein the actual measurement data and the virtual measurement data are in a data format that expresses a two-dimensional distribution of the magnetic field and that expresses a distribution of the measurement position on a two-dimension along the surface of the nonmagnetic body.

9. The information processing system for nondestructive inspection according to claim 8, wherein the information processing device corrects a shift of a central axis of the actual measurement data from a central axis of the measurement target, based on a symmetric property of the two-dimensional distribution of the magnetic field with respect to the central axis of the measurement target.

10. The information processing system for nondestructive inspection according to claim 1, wherein the sensor unit further includes a fixed magnetic sensor, the actual measurement data is scan measurement data obtained by moving the one or more magnetic sensors and performing scanning, and the information processing device reduces time-varying ambient magnetic field noise in the scan measurement data, based on fixed-point measurement data obtained by the fixed magnetic sensor while the actual measurement data is obtained.

11. A nondestructive inspection method for a measurement target that is a magnetic material covered by a nonmagnetic body, the nondestructive inspection method comprising:

reducing noise magnetic field components other than magnetic field components coming from the measurement target and/or emphasizing the magnetic field components coming from the measurement target in actual measurement data, including reducing the noise magnetic field components in the actual measurement data coming from a magnetic material other than the measurement target, based on the actual measurement data and virtual measurement data, wherein the actual measurement data is obtained by applying a magnetic field to the measurement target and actually measuring the magnetic field coming from the measurement target using one or more magnetic sensors of a sensor unit at a measurement position on a surface of the nonmagnetic body, the one or more magnetic sensors including at least one main sensor and at least one reference sensor corresponding, respectively, to the at least one main sensor, the at least one reference sensor being disposed further away from the measurement surface than the corresponding at least one main sensor, and the virtual measurement data is created by performing a simulation under virtual conditions that are obtained by modifying actual measurement conditions, the virtual conditions account for the magnetic material other than the measurement target by estimating a position of the magnetic material other than the measurement target on the basis of information obtained from an architectural plan, a survey using electromagnetic radar, or measurement with magnetic flux leakage testing.

12. The nondestructive inspection method according to claim 11, wherein the reducing reduces the noise magnetic field components in the actual measurement data that directly reach the one or more magnetic sensors from a magnetic field source for measurement, based on the actual measurement data and the virtual measurement data, and the virtual measurement data is created under the virtual conditions in which:

the magnetic field source for measurement that applies the magnetic field to the measurement target is present as in the actual measurement; and the measurement target is absent.

13. The nondestructive inspection method according to claim 11, wherein the virtual measurement data is created under the virtual conditions in which:

a magnetic field source for measurement that applies the magnetic field to the measurement target is present as in the actual measurement;

the measurement target is absent; and the magnetic material other than the measurement target is present in the nonmagnetic body as with in the actual measurement.

14. The nondestructive inspection method according to claim 11, wherein a proportion of the magnetic field increased by presence of the measurement target in the actual measurement data is extracted, based on the actual measurement data and the virtual measurement data, and the virtual measurement data is created under the virtual conditions in which:

a magnetic field source for measurement that applies the magnetic field to the measurement target is present as in the actual measurement; and the measurement target is absent.

15. The nondestructive inspection method according to claim 11, wherein a curve that represents the actual measurement data distributed along the measurement target is differentiated.

16. The nondestructive inspection method according to claim 11, wherein a decrease of the magnetic field components in the actual measurement data that come from a magnetic field source for measurement and that reach the one or more magnetic sensors through the magnetic material other than the measurement target is detected, based on the actual measurement data and the virtual measurement data, the decrease being caused by a breakage in the measurement target, and the virtual measurement data is created under the virtual conditions in which:

the magnetic field source for measurement that applies the magnetic field to the measurement target is present as in the actual measurement;

the measurement target is sound; and the magnetic material other than the measurement target is present in the nonmagnetic body as with in the actual measurement.

17. The nondestructive inspection method according to claim 11, wherein a curve of the actual measurement data distributed along the measurement target is smoothed.

18. The nondestructive inspection method according to claim 11, wherein the actual measurement data and the virtual measurement data are in a data format that expresses a two-dimensional distribution of the magnetic field and that expresses a distribution of the measurement position on a two-dimension along the surface of the nonmagnetic body.

19. The nondestructive inspection method according to 18, wherein a shift of a central axis of the actual measurement data from a central axis of the measurement target is corrected, based on a symmetric property of the two-dimensional distribution of the magnetic field with respect to the central axis of the measurement target.

20. The nondestructive inspection method according to claim 11, wherein the actual measurement data is scan measurement data obtained by moving the one or more magnetic sensors and performing scanning, and the reducing reduces time-varying ambient magnetic field noise in the scan measurement data, based on fixed-point measurement data obtained by a fixed magnetic sensor of the sensor unit while the actual measurement data is obtained.

* * * * *